(12) United States Patent
Zughaib et al.

(10) Patent No.: US 10,417,647 B2
(45) Date of Patent: Sep. 17, 2019

(54) SYSTEM AND METHOD FOR INVENTORY FINANCING

(76) Inventors: Edward Zughaib, Bethesda, MD (US); Mark Friesen, Surrey (CA); Micah Pittman, Seattle, WA (US)

( * ) Notice: Subject to any disclaimer, the term of this patent is extended or adjusted under 35 U.S.C. 154(b) by 1567 days.

(21) Appl. No.: 13/047,202

(22) Filed: Mar. 14, 2011
(Under 37 CFR 1.47)

(65) Prior Publication Data
US 2012/0239568 A1    Sep. 20, 2012

(51) Int. Cl.
*G06Q 40/00*    (2012.01)
*G06Q 30/02*    (2012.01)

(52) U.S. Cl.
CPC .................... *G06Q 30/02* (2013.01)

(58) Field of Classification Search
USPC .......................................... 705/35, 36 R, 37
See application file for complete search history.

(56) References Cited

U.S. PATENT DOCUMENTS

| | | | | |
|---|---|---|---|---|
| 6,021,397 | A * | 2/2000 | Jones ..................... | G06Q 40/06 705/36 R |
| 6,076,071 | A | 6/2000 | Freeny | |
| 7,136,875 | B2 | 11/2006 | Anderson et al. | |
| 2001/0042785 | A1* | 11/2001 | Walker ................... | G06Q 20/10 235/379 |
| 2004/0117302 | A1* | 6/2004 | Weichert .............. | G06Q 20/102 705/40 |
| 2004/0177032 | A1 | 9/2004 | Bradley et al. | |
| 2005/0060171 | A1* | 3/2005 | Molnar .............. | G06K 17/0022 340/572.1 |
| 2006/0261946 | A1 | 11/2006 | Himberger et al. | |
| 2006/0287078 | A1 | 12/2006 | Smolucha et al. | |

(Continued)

FOREIGN PATENT DOCUMENTS

| | | |
|---|---|---|
| WO | 2006/077230 A1 | 7/2006 |
| WO | 2008/106329 A2 | 9/2008 |

OTHER PUBLICATIONS

U.S. Appl. No. 13/047,279, filed Mar. 14, 2011, Edward Zughaib et al.

(Continued)

*Primary Examiner* — Hani M Kazimi
*Assistant Examiner* — Hatem M Ali
(74) *Attorney, Agent, or Firm* — Locke Lord LLP

(57) ABSTRACT

In embodiments of the invention, in accordance with a financing/bailment agreement, a dealer/bailee is required to retain the bailed property units in a controlled area to enable embodiments of the invention to perform real-time execution of inventory financing transactions. The bailed property units are tagged with tags for inventory identification. A reader device associated with the controlled area, detects entry or removal of the bailed property units by detecting a signal from a tag of the bailed property unit, the reader outputting an event signal. A server coupled to the reader, is programmed to access terms of the agreement, to monitor the event signals received from the reader. The server is coupled to one or more banks having an account of the bailor and an account of the bailee. The server is programmed to initiate a financial transfer by the one or more banks from the bailee account to the bailor account in accordance with the agreement, based on removal of the bailed property units in the controlled area.

25 Claims, 20 Drawing Sheets

(56) References Cited

U.S. PATENT DOCUMENTS

| | | | |
|---|---|---|---|
| 2006/0287978 A1* | 12/2006 | Cunningham | G06F 16/248 |
| 2006/0290496 A1 | 12/2006 | Peeters | |
| 2007/0094122 A1* | 4/2007 | Dillon-Ferris | G06Q 30/08 705/37 |
| 2007/0192216 A1 | 8/2007 | Arnold et al. | |
| 2009/0271272 A1* | 10/2009 | Berkowitz | G06Q 30/02 705/14.67 |
| 2010/0065632 A1 | 3/2010 | Babcock et al. | |
| 2012/0095856 A1 | 4/2012 | Sanjeev | |

OTHER PUBLICATIONS

U.S. Appl. No. 13/047,241, filed Mar. 14, 2011, Edward Zughaib et al.

Kim et al., "An EPC Gen 2 Compatibile Passive/Semi-active UHF RFID Transponder with Embedded FeRAM and Temperature Sensor", Abstract Only, IEEE Xplore Digital Library, 1 page.

Kocer et al., "An RF-Powered, Wireless Temperature sensor in Quarter Micron CMOS", Wireless Integrated Microsystems Engineering Research Center (WIMS-ERC), Universtiy of Michigan, Ann Arbor, MI 48109, 4pp.

Shen et al., "Fully integrated passive UHF RFID tag with temperature sensor for environment monitoring", Abstract Only, IEEE Xplore Digital Library, 1 page.

Namjun Cho et al., "A 8-μ W, 0.3-mm2 RF-Powered Transponder with Temperature Sensor for Wireless Environmental Monitoring," Dept. of EE & CS, Korea Advanced Institute of Science and Technology(KAIST) 371-1, Guseong-dong, Yuseong-gu, Daejeon, 305-701, Republic of Korea * Dept. of EE, Wonkwang University, Iksan, 570-749, Republic of Korea, 4pp.

"RFID for the Wine Industry", FSN Application Brochure 0819, Falken Secure Networks, www.falkensecurenetworks.com, 4pp.

"RFID and the Beverage Market (part 2)", http://rfid.thingmagic.com/rfid-blog/bid/39360/RFID-and-the-Beverage-Market-part-2, posted by Ken Lynch on Aug. 24, 2010, 2pp.

http://www.eprovenance.com/PNSS90A2/questions/index.html, "EProvenance Fine Wine Cold Chain System—Overview", 2pp.

Rhea Wessel, "Interactive Wine Kiosk Wows Customers", RFID Journal, Oct. 27, 2009, http://www.rfidjournal.com/article/view/5329, 4pp.

"eProvenance: A wine provenance verification solution", The Wine Collector, Mar. 24, 2008, 2pp.

Efrain Viscarolasaga, "Wireless wine tracked by eProvenance's RFID", Mass High Tech: The Journal of New England Technology, Dec. 5, 2008, 2pp.

"RFID to help prevent fraud", Mar. 3, 2010, Wein-Plus.com—The Internet wine network, 1 page.

http://www.eprovenance.com/LMYRJ0V9/questions/gettingStarted.html, "How can you get started monitoring your shipments?", 3pp.

http://www.eprovenance.com/LMYRJ0V9/questions/what.html, "What is an eProvenance Fine Wine Cold Chain System?", 2pp.

http://www.packagingnews.co.uk/z/rfid-track-and-trace/eprovenance-launches-rfid-powered-intelligent-bottle, 2pp.

\* cited by examiner

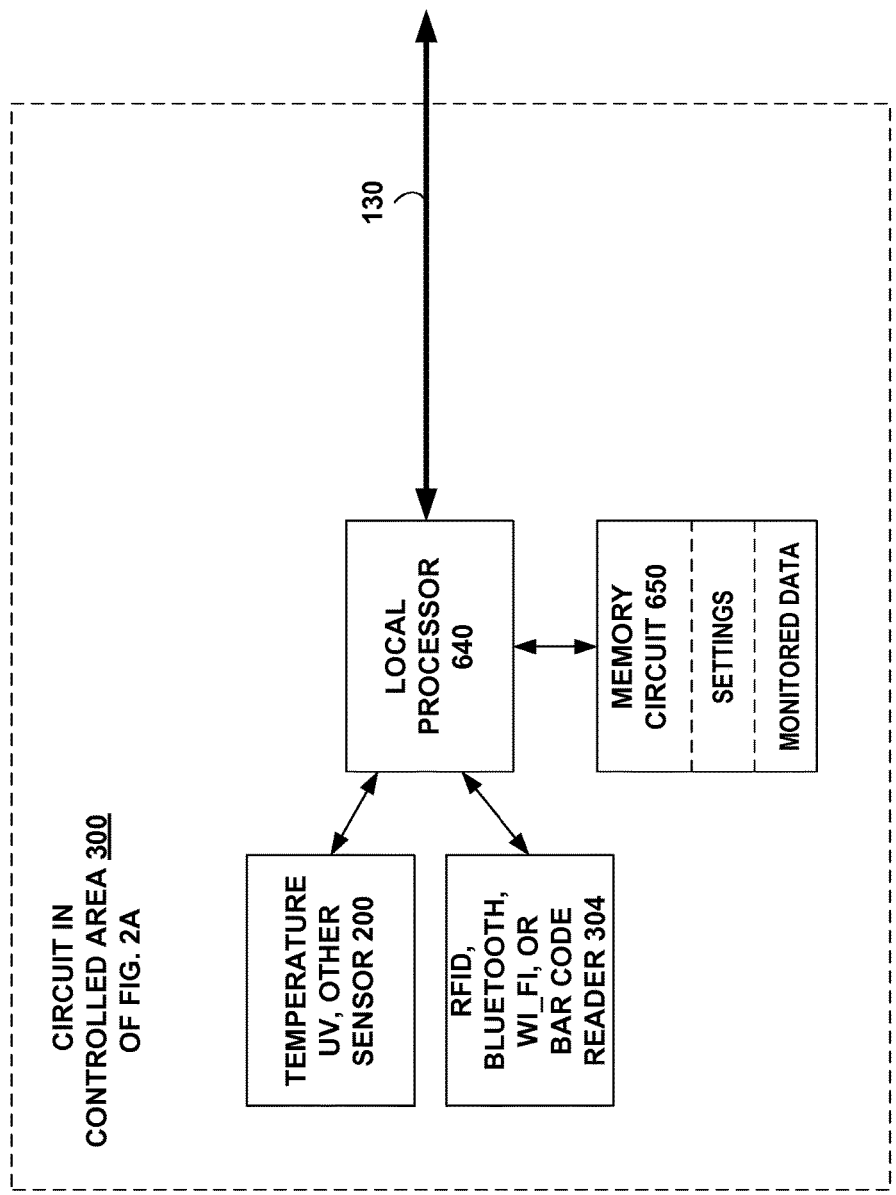

SYSTEM AND METHOD FOR INVENTORY FINANCING

FIELD OF THE INVENTION

The technical field broadly relates to electronic funds transfer and more particularly relates to financial transfers from a bailee account to a bailor account.

BACKGROUND OF THE INVENTION

Inventory financing of bailed retail goods, such as floor plan or wholesale lending, is a form of financing in which each loan advance is made against a specific piece of bailed collateral. As each piece of collateral is sold by the dealer/bailee, the loan advance against that piece of collateral is repaid to the financing entity/bailor. The value of the collateral in bailed inventories of perishable goods, such as cases of frozen foods, bottles of wine, pharmaceutical products, and the like, while in the possession of the dealer/bailee, is subject to risk of loss that is a function of the environmental history of the goods and the duration of their storage. Because of the financing entity/bailor's inability to exercise full control over the bailed goods, the exposure to loss is generally greater than in other similar types of financing. Most dealer/bailees have minimal capital bases relative to debt. As a result, close and frequent review of the dealer/bailee's financial information is necessary.

In bailed inventories of perishable goods, the financing entity/bailor generally includes in the financing/bailment agreement with the dealer/bailee, provisions for variable interest rates on the loaned principal that are a function of the environmental history of the goods and the duration of their storage. Ranges of required environmental conditions to maintain the perishable goods in a marketable condition may be specified in the agreement. Because the goods are perishable, their intrinsic value over time decreases, and the rate of such decrease in value may depend on environmental factors, such as temperature, humidity, mechanical vibration, light levels, and the like. Correspondingly, the risk of loss increases if the required ranges of environmental conditions are exceeded. The interest on the principal to be paid by the bailee to the bailor depends on the agreement between the parties as to the risk of loss due to environmental factors. Current systems for electronic funds transfer from a dealer/bailee to a financing entity/bailor, fail to account for changes in the intrinsic value of perishable goods during a bailment, due to environmental factors and duration of storage.

BRIEF SUMMARY OF THE INVENTION

In embodiments of the invention, a financing/bailment agreement between a financing entity/bailor of bailed property units and a dealer/bailee, includes provisions for repayment of the loaned principal that are a function of the environmental history of the goods and the duration of their storage. As each property unit is sold by the dealer/bailee, the loan advance against that property unit, as collateral, is automatically repaid by embodiments of the invention to the financing entity/bailor. In accordance with the financing/bailment agreement, the dealer/bailee is required to retain the bailed property units in a controlled area to enable embodiments of the invention to perform real-time execution of inventory financing transactions.

The bailed property units are tagged with tags for inventory identification using RFID tags, bar coded tags, tags incorporating Bluetooth circuitry, or tags incorporating Wi-Fi or other suitable wireless circuitry. The tags may be based on any technology that uses communication via electromagnetic or acoustic waves to exchange data between a reader device and a tag attached to an object, for the purpose of identification and tracking.

A reader device associated with the controlled area, detects entry or removal of the bailed property units by detecting a signal from a tag of the bailed property unit, the reader outputting an event signal.

A server coupled to the reader, is programmed to access terms of the agreement, to monitor the event signals received from the reader. The server is coupled to one or more banks having an account of the bailor and an account of the bailee. The server is programmed to initiate a financial transfer by the one or more banks from the bailee account to the bailor account in accordance with the agreement, based on removal of the bailed property units in the controlled area.

The server is programmed to initiate a financial transfer based duration of custody, removal, theft, damage, or tampering of the bailed property units in the controlled area.

In this manner, as each property unit is sold by the dealer/bailee or is altered during storage, the loan advance against that property unit is automatically repaid to the financing entity/bailor, in accordance with the financing/bailment agreement.

BRIEF DESCRIPTION OF THE FIGURES

FIG. 2B illustrates example tag reading circuitry environmental sensors, and communication circuitry in the controlled area of FIG. 2A.

DETAILED DESCRIPTION OF THE INVENTION

Figure 1A:
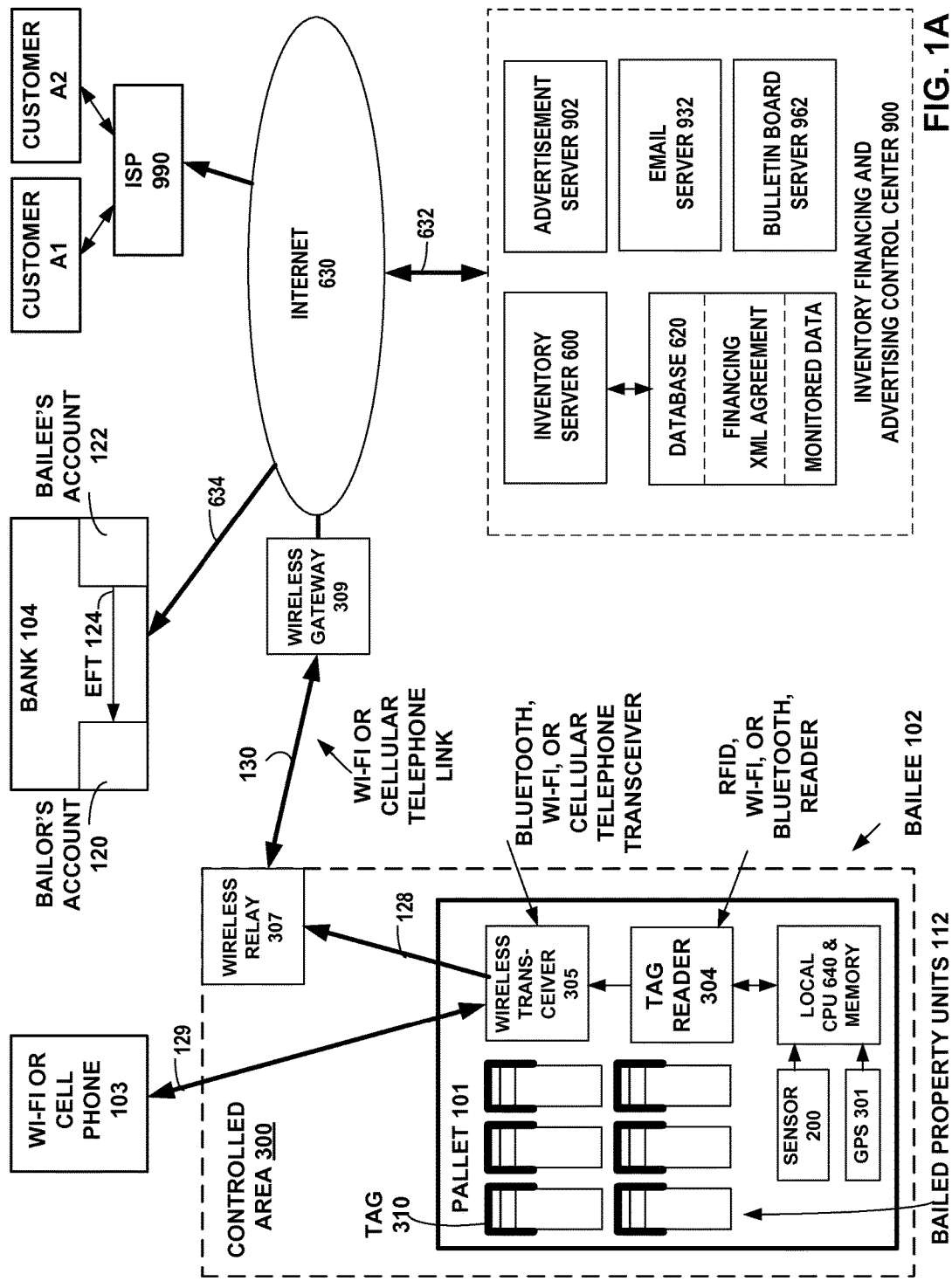
FIG. 1A illustrates an example system for inventory financing, inventory tracking, and targeted advertising of bailed property units, wherein a portable pallet in a controlled area holds the bailed property units that are tagged for inventory identification and tracking via a wireless link, the pallet being equipped with tag reading circuitry, environmental sensors, and communication circuitry to enable real-time execution of inventory financing transactions, tracking during transport, and targeted advertising of the bailed property.

FIG. 1A illustrates an example system for inventory financing, inventory tracking, and targeted advertising of bailed property units 112. The financing entity/bailor of the bailed property units 112 generally includes in the financing/bailment agreement with the dealer/bailee, provisions for variable interest rates on the loaned principal that are a function of the environmental history of the goods and the duration of their storage. As an inducement to the dealer/bailee entering into the financing agreement with the financing entity/bailor, the bailor offers the use of the system to prepare targeted advertisements of the bailee's inventory for distribution to the bailee's customers. As each property unit 112 is sold by the dealer/bailee 102, the loan advance against that property unit 112, as collateral, is repaid to the financing entity/bailor. The interest on the principal to be paid by the bailee to the bailor depends on the agreement between the parties as to the risk of loss due to environmental factors, and accounts for changes in the intrinsic value of perishable goods during a bailment, due to environmental factors and duration of storage.

When the bailed property units 112 come into the possession of the dealer/bailee, they may be aggregated in the form of individual units, cases, pallets, or shipping containers. In accordance with the financing/bailment agreement, the dealer/bailee 102 is required to retain the bailed property units 112 in a controlled area 300 to enable the system of FIG. 1A to perform real-time execution of inventory financing transactions with the inventory server 600, tracking with the tracking circuitry 301 during transport within the controlled area 300, and targeted advertising of the bailed property 112 with the advertisement server 902, email server 932, and bulletin board server 962 in the inventory financing and advertising control center 900.

The bailed property units 112 are tagged with tags 310 for inventory identification and tracking and for targeted advertising, using RFID tags, bar coded tags, tags incorporating Bluetooth circuitry, or tags incorporating Wi-Fi or other suitable wireless circuitry. The tags 310 may be based on any technology that uses communication via electromagnetic or acoustic waves to exchange data between a reader and a tag attached to an object, for the purpose of identification and tracking.

The example controlled area 300 shown in FIG. 1A may be a relatively large geographic area wherein the location and condition of the bailed property units 112 may be monitored over wireless links 128, 129, and 130. The example controlled area 300 shown in FIG. 2A may be a bounded area such as a warehouse or a wine cellar at a restaurant, wherein the condition of the bailed property units 112 is monitored with tag reading circuitry 304, environmental sensors 200, and communication circuitry 640 in the controlled area 300, to enable real-time execution of inventory financing transactions and targeted advertising of the bailed property.

For example, a portable pallet 101 in the controlled area 300 if FIG. 1A holds the bailed property units 112 that are tagged with tags 310 for inventory identification and tracking via a wireless link 128. The pallet 101 is equipped with tag reading circuitry 304, environmental sensors 200, and communication circuitry 305. Environmental conditions sensed by the sensed by the sensors 200 and information from the tags 310 on the identity of individual bailed units 112 detected by the tag reader 304 are processed by the local processor 640 and accumulated in the memory on the pallet 101 as monitored data that is transmitted by the wireless Bluetooth, Wi-Fi, or cellular telephone transceiver 305 over link 128 to the wireless relay 307. The wireless relay 307 forwards the monitored data to the wireless gateway 309 over wireless link 130 for transfer via the Internet 630 to the inventory financing and advertising control center 900. Real-time execution of inventory financing transactions is performed with the inventory server 600, tracking with the GPS circuitry 301 is performed during transport, and targeted advertising of the bailed property 112 is performed with the advertisement server 902, email server 932, and bulletin board server 962 in the inventory financing and advertising control center 900. The monitored data of the environmental conditions sensed by the sensed by the sensors 200 and information from the tags 310 on the identity of individual bailed units 112 may also be received by the Wi-Fi or cell phone 103, such as an iPhone™ over the wireless link 129.

Figure 1B:
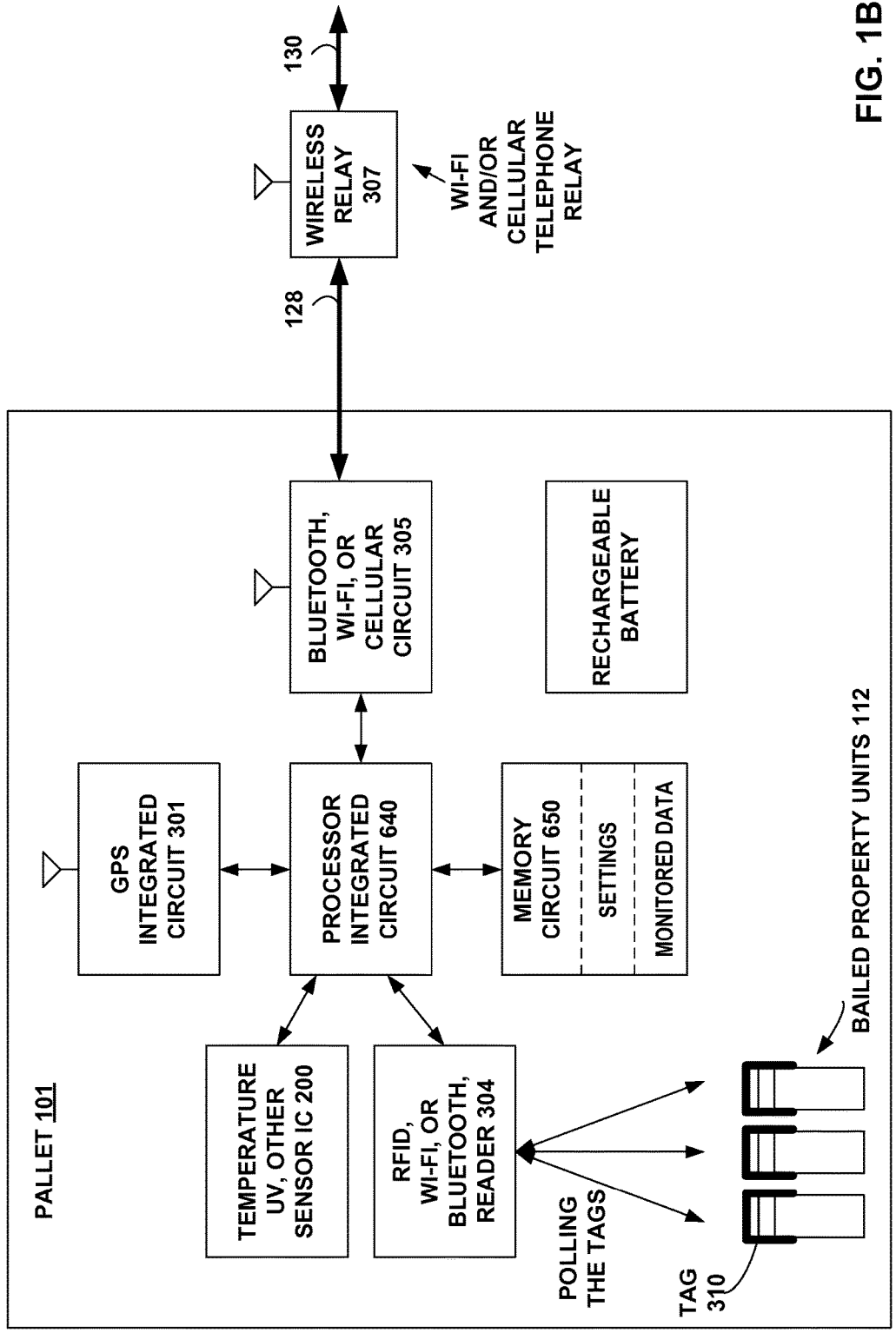
FIG. 1B illustrates example tag reading circuitry and communication circuitry on the portable pallet of FIG. 1A.

FIG. 1B illustrates example tag reading circuitry and communication circuitry on the portable pallet of FIG. 1A. The RFID, Wi-Fi, or Bluetooth reader 304 polls the identity encoded in the tags 310 on the individual bailed units 112 and passes the identity information to the local processor 640. The temperature, ultra violet light, or other environmental sensor 200 passes its sensed environmental information to the local processor 640. The GPS circuit 301 passes its sensed location information to the local processor 640. The local processor 640 processes the received information and formulates the monitored data that is stored in the memory 650. The monitored data is transmitted by the wireless Bluetooth, Wi-Fi, or cellular telephone transceiver 305 over link 128 to the wireless relay 307. The wireless relay 307 forwards the monitored data to the wireless gateway 309 over wireless link 130 for transfer via the Internet 630 to the inventory financing and advertising control center 900. The memory 650 also stores control information received from the inventory server 600, in accordance with the financing/bailment agreement.

Bluetooth short-range radio devices are designed to find other Bluetooth devices within their ten meter radio communications range, as described in the Bluetooth Specification, Version 4.0, Jun. 30, 2010, incorporated herein by reference. The Bluetooth reader 304 may assume the role of a master device and the Bluetooth tags 310 assume the role of slave devices that are polled by the master device to determine the identity encoded in the tag. A Bluetooth tag 310 may be embodied as a single integrated circuit chip that includes a memory containing the tag identity, the Bluetooth circuit being programmed to perform the function of the tag 310 by responding when polled by the Bluetooth reader 304. The Bluetooth tag requires only a small amount of power to operate, which may be provided by a small button-sized battery.

Similarly, Wi-Fi short-range radio devices conforming to the IEEE 802.11 communications standard, IEEE Std 802.11™-2007, incorporated herein by reference, are designed to find other Wi-Fi devices within a radio communications range of up to one-hundred meters. The Wi-Fi reader 304 may poll the Wi-Fi tags 310 to determine the identity encoded in the tag. A Wi-Fi tag 310 may be embodied as a single integrated circuit chip that includes a memory containing the tag identity, the Wi-Fi circuit being programmed to perform the function of the tag 310 by responding when polled by the Wi-Fi reader 304. The Wi-Fi tag power requirements may be kept small for short ranges of approximately ten meters, allowing the tags 310 to be powered by a small button-sized battery.

Figure 1C:
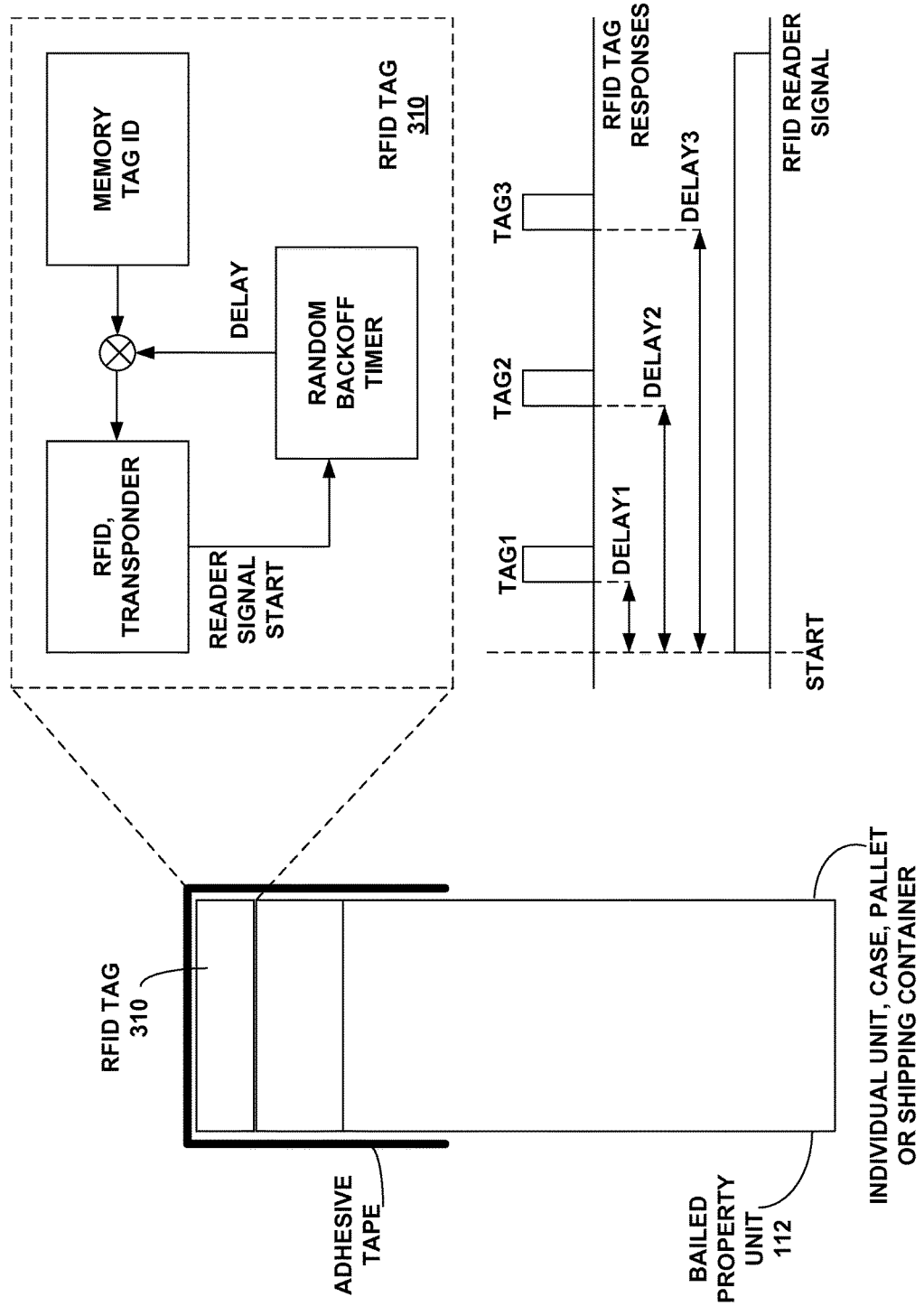
FIG. 1C illustrates example RFID tag circuitry fastened to each of the of bailed property units of FIGS. 1A and 1B.

FIG. 1C illustrates example RFID tag circuitry fastened to each of the of bailed property units 112 of FIGS. 1A and 1B. RFID tags may be the passive type or the active type. A passive RFID tag 310 requires no internal power source to communicate with an RFID reader 304, and is only active when it is near an RFID reader 304, which energizes the tag 310 with a continuous radio frequency signal at a resonant frequency of the antenna. The small electrical current induced in the antenna by the continuous radio frequency signal provides enough power for the integrated circuit in the tag 310 to power up and transmit a modulated response with the tag's identity, typically by backscattering the continuous carrier wave from the RFID reader 304. A passive RFID tag 310 can include writable electrically erasable, programmable, read-only memory (EEPROM) for storing data to be transmitted to the RFID reader, which modulates the continuous carrier wave sent by the RFID reader 304. Reading distances for passive RFID tags 310 typically range from a few centimeters to a few meters, depending on the radio frequency and antenna design. By contrast, active RFID tags require a power source to receive and transmit information with an RFID reader. The RFID standard, ISO/IEC 18000: Information Technology—Radio Frequency Identification for Item Management, is incorporated herein by reference.

FIG. 1C illustrates the sequential reading of a plurality of RFID tags 310 on the pallet 101. The plurality of RFID tags 310 receive an RFID interrogation signal from the RFID reader 304, as shown in FIG. 1C. Each RFID tag 310 includes an RFID transponder circuit, a memory tag ID circuit that encodes the identity of the tag, and a random backoff timer circuit. When an RFID tag 310 initially receives the reader interrogation signal from reader 304, the RFID transponder in the RFID tag 310 sends a reader signal start indication to the random backoff timer circuit in the tag 310. The random backoff timer circuit in each tag 310 times the expiration of a random delay after it has received the reader signal start indication. It is probable that each of the plurality of tags 310 on the pallet 101 will have a different value for the random delay provided by its respective random backoff timer circuit. When a random backoff timer circuit reaches its delay value, for example when tag1 has its random backoff timer circuit reach delay1, the random backoff timer circuit turns on a gate between the RFID transponder circuit and the memory tag ID circuit for a short interval sufficient to enable the memory tag ID circuit to transfer the encoded identity of the tag to the RFID transponder circuit for backscatter modulation of the reader interrogation signal, communicating the tag's identity back to the RFID reader 304. Three example RFID tags, tag1, tag2, and tag3 will have three different, respective random delays, delay1, delay2, and delay3, as shown in FIG. 1C, enabling the tags to sequentially communicate their identities back to the reader 304. In this manner, the RFID reader 304 may poll the identities of a plurality of RFID tags for the plurality of bailed property units 112 on the pallet 101. The sequential reading of a plurality of RFID tags 310 is an extension of a single reading of an individual tag. Sequential reading of RFID tags may be performed using the RFID high frequency (HF) standard (ISO 18000-3) RFID tags, the RFID ultra high frequency (UHF) standard (ISO 18000-6) RFID tags, or the RFID super high frequency (SHF) standard (ISO 18000-4) RFID tags. In embodiments, the RFID reader 304 may transmit interrogation signals in the form of clock pulses that provide the receiving tags 310 with a timing reference for their random backoff timer circuits.

The pallet 101 of FIG. 1A includes a location detector, such as the Global Positioning System (GPS) unit 301, to enable tracking the location of the pallet 101 in the controlled area 300. To improve location determining accuracy in areas sheltered from the GPS satellites, the GPS unit 301 may also be an assisted GPS or A-GPS receiver that uses a data connection such as a cellular telephone network or a Wi-Fi Positioning System, to connect to an assistance server for assisted-GPS information. The GPS unit 301 outputs an event signal via the wireless relay 307 to the inventory server 600. The inventory server 600 is programmed to initiate a financial transfer by the bank from the bailee account to the bailor account in accordance with the agreement, based on the location of the bailed property units, duration of custody, removal, theft, damage or tampering of the bailed property units in the controlled area. The financial transfer may be initiated in response to the location information indicating that the location of the pallet 101 is beyond a location limit specified in the agreement. The advertisement server 902 coupled to the inventory server 600, is programmed to collect data based on the event signals received from the tag reader 304, sensors 200, and GPS unit 301 by the inventory server and use that data to prepare targeted advertisements of the bailee's inventory stored on the pallet 101 for transmission to customers, for example customers located in the vicinity of the detected location of the pallet 101.

In operation, the GPS unit 301 tracks the location of the bailed property units 112 on the pallet 101 in the controlled area 300. The tag reader 304 and GPS unit 301 output monitored identity data and location data of the bailed property units 112, in an event signal via the wireless relay 307, which is transmitted to the inventory server 600 and advertisement server 902. The inventory server 600 accesses terms of the financing/bailment agreement, to provide control information to the reader 304 and local processor 640 in accordance with the agreement. The inventory server 600 monitors the monitored data in the event signals received from the reader 304 and the GPS unit 301. The inventory server 600 initiates a financial transfer by the bank 104 from the bailee account 122 to the bailor account 120 in accordance with the agreement, based on the identity and location of the bailed property units 112 in the controlled area 300. The bank 104 may be one or more banks where the respective accounts may be located in separate banks that may communicate through electronic funds transfer (EFT) or other forms of bank clearing to accomplish the financial transfer. The advertisement server 902 collects the monitored data and based on the identity and location of the bailed property units 112, prepares targeted advertisements of the bailee's inventory of bailed property units 112 in the controlled area 300, which are sent to the bailee's customers.

Figure 2A:
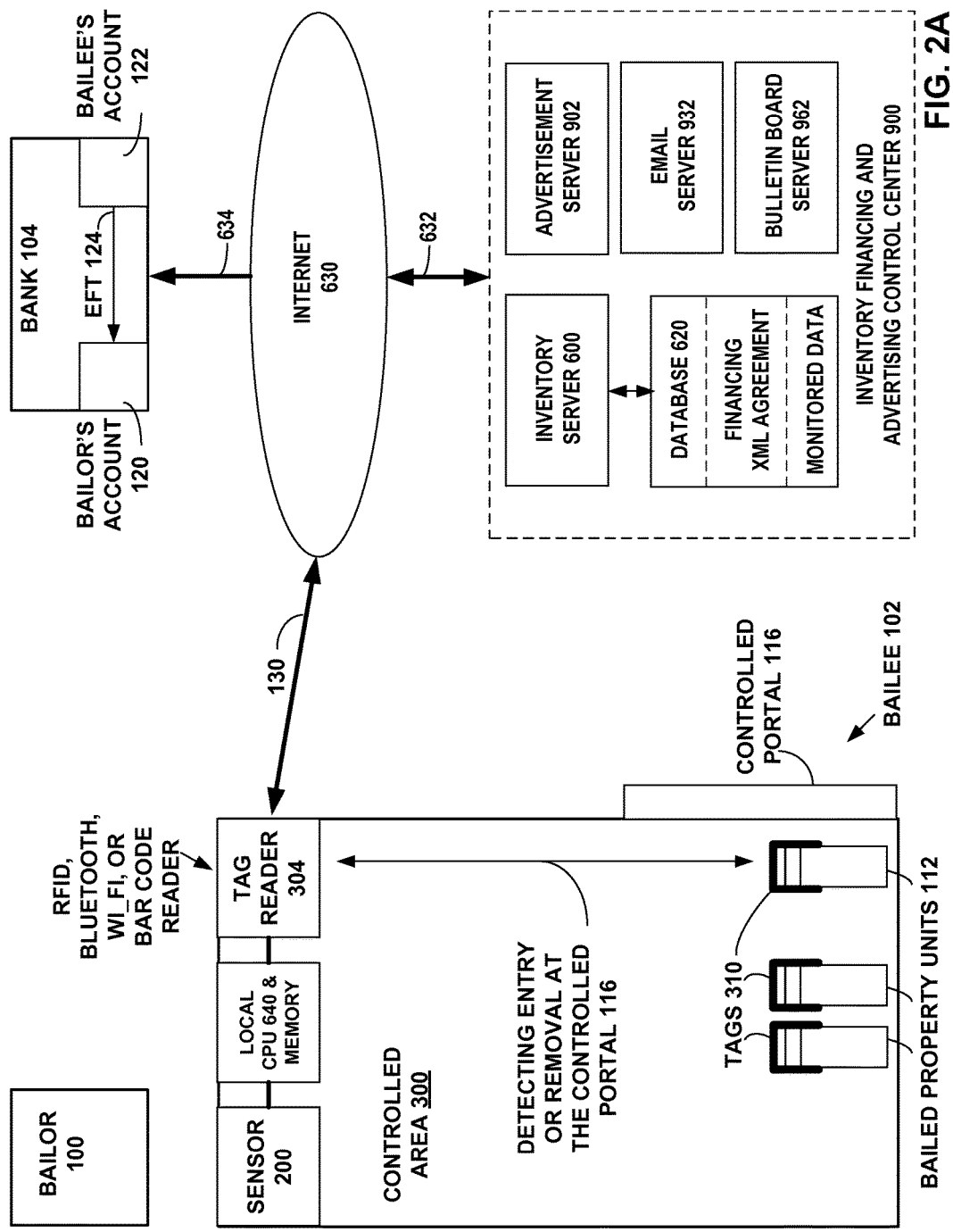
FIG. 2A illustrates an example system for inventory financing and targeted advertising of bailed property units in a controlled area such as a warehouse or a wine cellar at a restaurant, wherein the bailed property units are tagged for inventory identification, the controlled area being equipped with tag reading circuitry environmental sensors, and communication circuitry to enable real-time execution of inventory financing transactions and targeted advertising of the bailed property.

FIG. 2A illustrates an example system for inventory financing and targeted advertising of bailed property units 112 in a controlled area 300 such as a warehouse or a wine cellar at a restaurant, wherein the bailed property units 112 are tagged for inventory identification, the controlled area 300 being equipped with tag reading circuitry 304, environmental sensors 200, and communication circuitry 640 to enable real-time execution of inventory financing transactions and targeted advertising of the bailed property 112. The controlled area 300 of bailee 102, receives bailed property units 112 owned by a bailor 100 in accordance with the financing/bailment agreement between the bailor and the bailee. The controlled area 300 includes a controlled portal 116 for removal of the property units 112. Each unit has an RFID tag 310. In example embodiments, the tags 310 may be RFID, Bluetooth, Wi-Fi, or bar code tags. RFID tags 310 may be passive or active RFID tags. Embodiments of the invention provide financial transfer of funds 124 from a bailee account 122 to a bailor account 120 in a bank 104. The controlled area 300 receives and stores bailed property units 112 owned by the bailor 100 and provides the controlled portal 116 for entry or removal of the bailed property units by the bailee. Each unit 112 of the bailed property may have an RFID tag 310. An RFID reader 304 associated with the controlled area 300, detects entry, removal, or tampering of any of the bailed property units 112 by detecting an RFID signal from the RFID tag 310 when the bailed property unit is entered or removed via the portal 116 or tampered with. The RFID reader 304 outputs an event signal over a signal line 130 to an inventory server 600 coupled to the signal line via the Internet 630 and link 632. The inventory server 600 comprises a central processor 605, a memory 610, and a database 620. The inventory server 600 has access to the terms of the financing/bailment agreement and is programmed to provide control information to the local processor 640 and the RFID reader 304 in accordance with the financing/bailment agreement, for example, no event signal is to be sent until an agreed minimum number of bailed property units have been removed as free samples. The inventory server 600 is programmed to monitor the event signals received from the RFID reader 304, the inventory server being coupled to the bank 104 having an account 120 of the bailor and an account 122 of the bailee. The inventory server 600 is programmed to initiate a financial transfer EFT 124 by the bank 104 from the bailee account 122 to the bailor account 120 in accordance with the financing/bailment agreement, based on duration of custody, theft, or tampering of the bailed property units 112 in the controlled area 300.

FIG. 2A shows an example environmental sensor 200 associated with the controlled area 300, to detect ambient environmental conditions and output an environmental signal in the system of FIGS. 1A and 2A. The environmental sensor 200 may maintain in memory 650 a history of the ambient environmental conditions in the controlled area 300. Measured values of environmental parameters, for example, temperature sensed by the environmental sensor 200, may be recorded over time by the environmental sensor 200 in a database in memory 650. The identity of each bailed property unit 112 may be stored in its RFID tag 310 and read by the RFID reader 304 when the unit is initially received in the controlled area 300, the unit's identity being transferred to the memory 650. In this manner, a database may be maintained in memory 650 by the environmental sensor 200 for each bailed property unit 112, to keep track of each bailed property unit's exposure to the environment within the controlled area 300 for the duration that the unit occupies the controlled area 300. The environmental sensor 200 outputs an environmental signal as part of the event signal sent over signal line 130 to the inventory server 600 programmed to initiate a financial transfer by the bank 104 from the bailee account 122 to the bailor account 120 in accordance with the financing/bailment agreement, based on detected deviations from an agreed range of environmental conditions in the controlled area 300.

FIG. 2B illustrates example tag reading circuitry environmental sensors, and communication circuitry in the controlled area of FIG. 2A. The RFID, Bluetooth, Wi-Fi or bar code reader 304 reads the identity encoded in the tags 310 on the individual bailed units 112 and passes the identity information to the local processor 640. The temperature, ultra violet light, or other environmental sensor 200 passes its sensed environmental information to the local processor 640. The local processor 640 processes the received information and formulates the monitored data that is stored in the memory 650. The monitored data is transmitted by the link 130 for transfer via the Internet 630 to the inventory financing and advertising control center 900. The memory 650 also stores control information received from the inventory server 600, in accordance with the financing/bailment agreement. Bluetooth readers 304 may be master devices in and the Bluetooth tags 310 may be slave devices that are polled by the master device to determine the identity encoded in the tag. The memory 650 may store computer programs of instructions and a database to keep track of each bailed property unit's exposure to the environment within the controlled area 300 for the duration that the unit occupies the controlled area 300. An inventory control program may be included in the memory 650 to maintain inventory control so that as each unit of the bailed goods, such as a case or bottle, is detected by the RFID reader 304 as being removed from the controlled area 300 or being tampered with.

The inventory server 600 is programmed to feedback control information to the memory 650 and environmental sensor 200, for example where each controlled area may have a different type of bailed property unit stored, requiring setting a different temperature or other environmental conditions for storage, in accordance with the agreement.

The inventory server 600 is programmed to calculate a price of a bailed property unit 112 associated with the financial transfer, in accordance with terms of the financing/bailment agreement and to charge interest at a variable interest rate with respect to the duration of custody and risk-of-loss. A computation is made of the funds in the agreed amount that the bailee owes to the bailor. Because the goods are perishable, the program in the inventory server 600 may compute the degree to which their intrinsic value has decreased, based on the recorded history of the environmental exposure of the unit, such as temperature, humidity, mechanical vibration, ultra violet light levels, and the like. The price calculated by the program, to be paid by the bailee to the bailor, may depend on the financing/bailment agreement between the parties as to the risk of loss due to environmental factors.

The bar code reader 304 may be a laser scanner array and optical camera. The laser scanner array illuminates the bar code printed on the surface of tag 310 encoding the tag ID, and the image of the bar code is captured by the optical camera and decoded as the tag identity. An example reference describing bar coding is T. Pavlidis, et al, "Fundamentals of Bar Code Information Theory," *Computer*, vol. 23, no. 4, pp. 74-86, April 1990, incorporated herein by reference.

Figure 3:
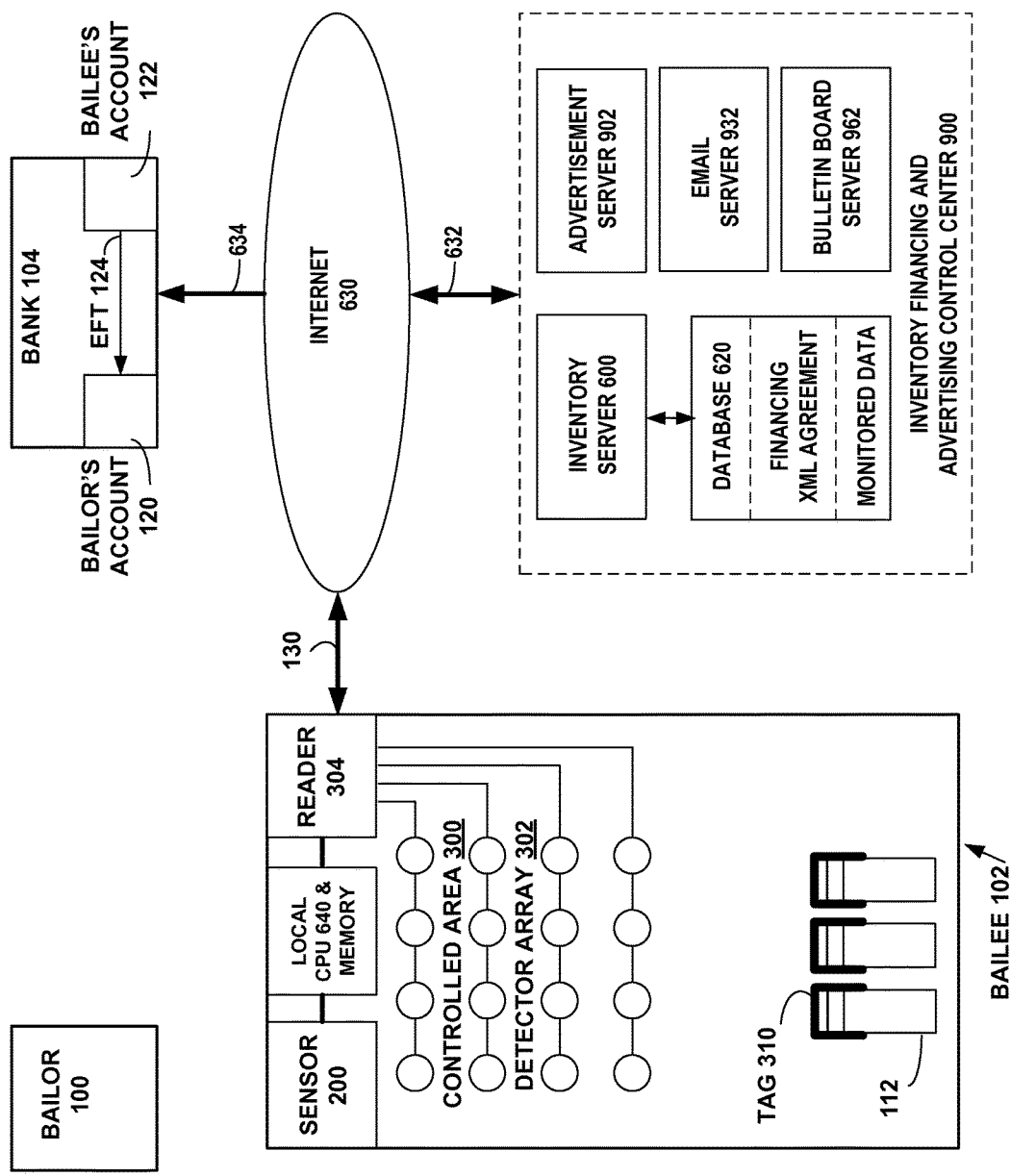
FIG. 3 illustrates an example system for inventory financing and targeted advertising of bailed property units in a controlled area such as a warehouse or a wine cellar at a restaurant, wherein the controlled area includes an array of detectors for detecting the bailed property units, each of the bailed property units being tagged for inventory identification.

FIG. 3 is an example system illustrating an array of RFID detectors 302 in a controlled area 300 of the bailee 102. The RFID detectors in the array may be separate antennas of the RFID reader 304, distributed in the controlled area 300. The array of RFID detectors 302 may detect RFID tags 310 of FIGS. 1A and 2A on the bailed property units 112. The RFID tags 302 of FIG. 3 include a tamper detection mechanism. The RFID tags 302 may be passive or active RFID tags. The RFID reader 304 associated with the controlled area 300 is coupled to one or more of the detectors 302, to detect tampering with any of the bailed property units 112 by detecting an RFID signal from an RFID tag 310 of the bailed property unit 112 being tampered with. The RFID detectors 302 output a tampering signal to the RFID reader 304, which is sent as part of the event signal over signal line 130 to the inventory server 600, initiating a financial transfer 124 from the bailee account 122 to the bailor account 120 at the bank 104.

The RFID reader 304 outputs an event signal over a signal line 130 to the inventory server 600 coupled to the signal line via the Internet 630 and link 632. The inventory server 600 has access to the terms of the financing/bailment agreement and is programmed to provide control information to the local processor 640 and the RFID reader 304 in accordance with the financing/bailment agreement, such as no event signal is to be sent until an agreed minimum number of bailed property units have been removed as free samples. The inventory server 600 is programmed to monitor the event signals received from the RFID reader 304, the inventory server being coupled to the bank 104 having an account of the bailor and an account of the bailee. The inventory server 600 is programmed to initiate a financial transfer EFT 124 by the bank 104 from the bailee account 122 to the bailor account 120 in accordance with the financing/bailment agreement, based on duration of custody, theft, or tampering of the bailed property units 112 in the controlled area 300.

Figure 4A:
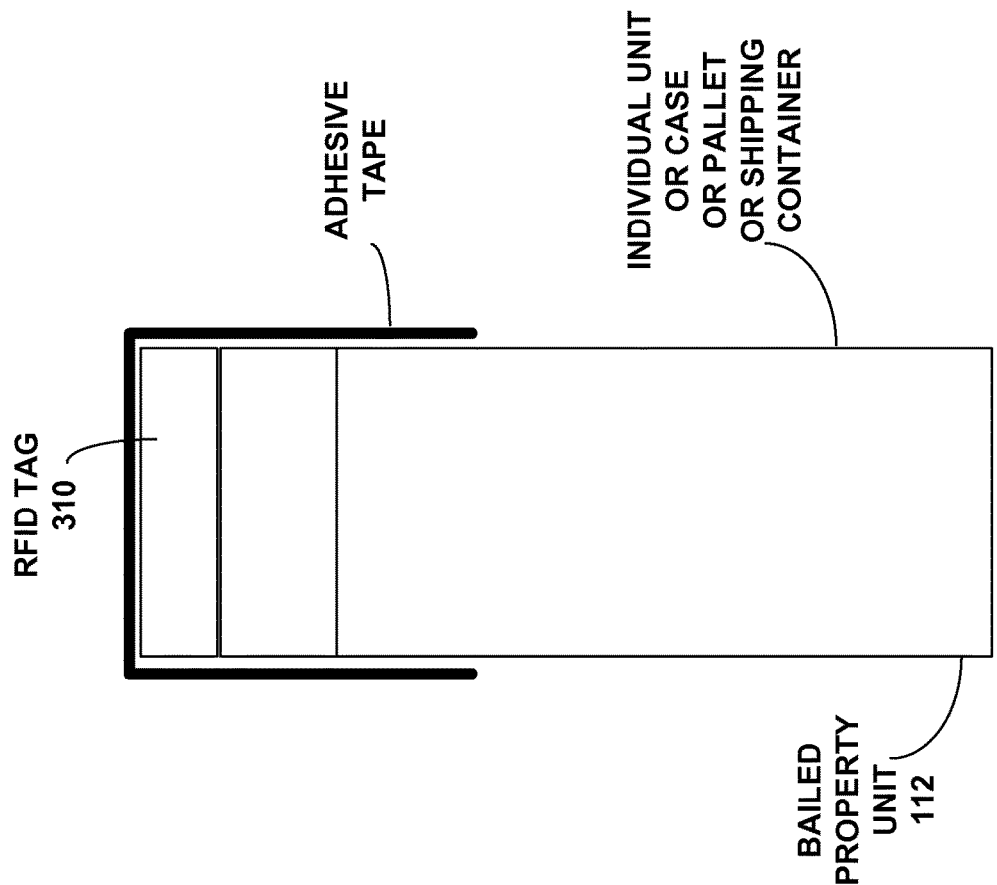
FIG. 4A illustrates an example bailed property unit in FIG. 1A, 2A, or 3, such as an individual wine bottle, a case of bottles, a portable pallet of cases, or a shipping container of pallets, each bailed property unit being tagged for inventory identification with an RFID tag, fastened to the unit.

FIG. 4A illustrates an example bailed property unit 112 in FIG. 1A, 2A, or 3, such as an individual wine bottle, a case of bottles, a portable pallet of cases, or a shipping container of pallets, each bailed property unit being tagged for inventory identification with an RFID tag 310, fastened to the unit.

Figure 4B:
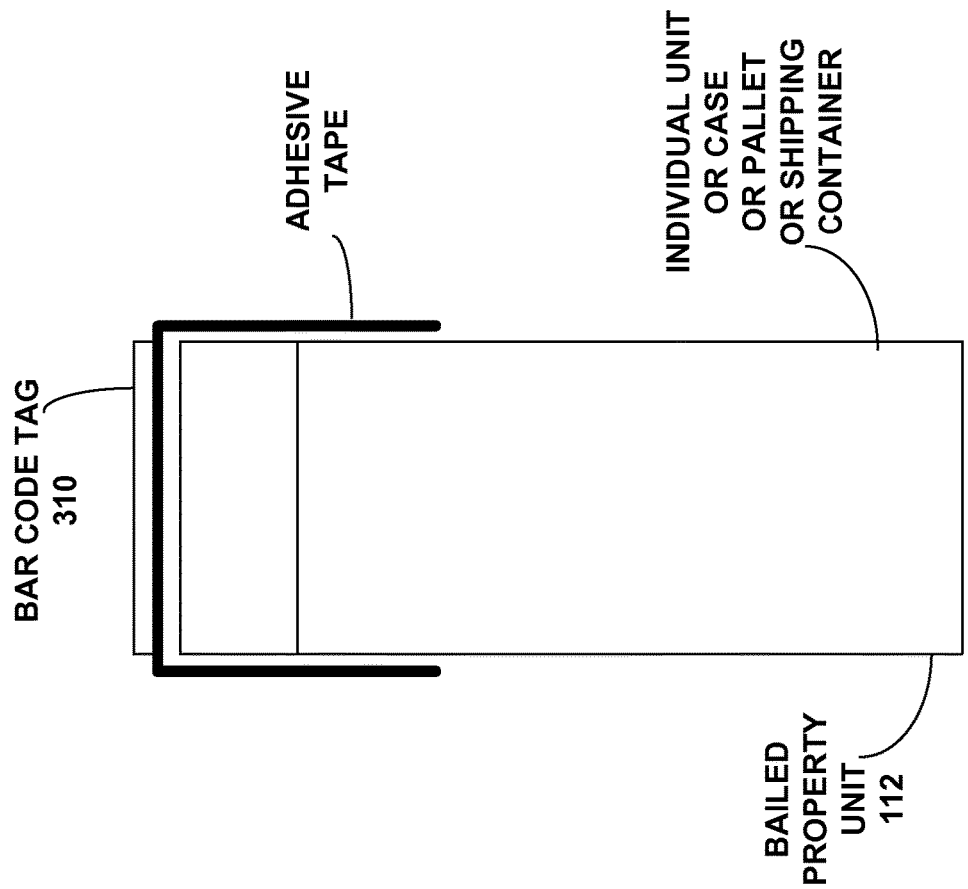
FIG. 4B illustrates an example bailed property unit in FIG. 1A, 2A, or 3, such as an individual wine bottle, a case of bottles, a portable pallet of cases, or a shipping container of pallets, each bailed property unit being tagged for inventory identification with a bar coded tag, fastened to the unit.

FIG. 4B illustrates an example bailed property unit 112 in FIG. 1A, 2A, or 3, such as an individual wine bottle, a case of bottles, a portable pallet of cases, or a shipping container of pallets, each bailed property unit being tagged for inventory identification with a bar coded tag 310, fastened to the unit.

Figure 4C:
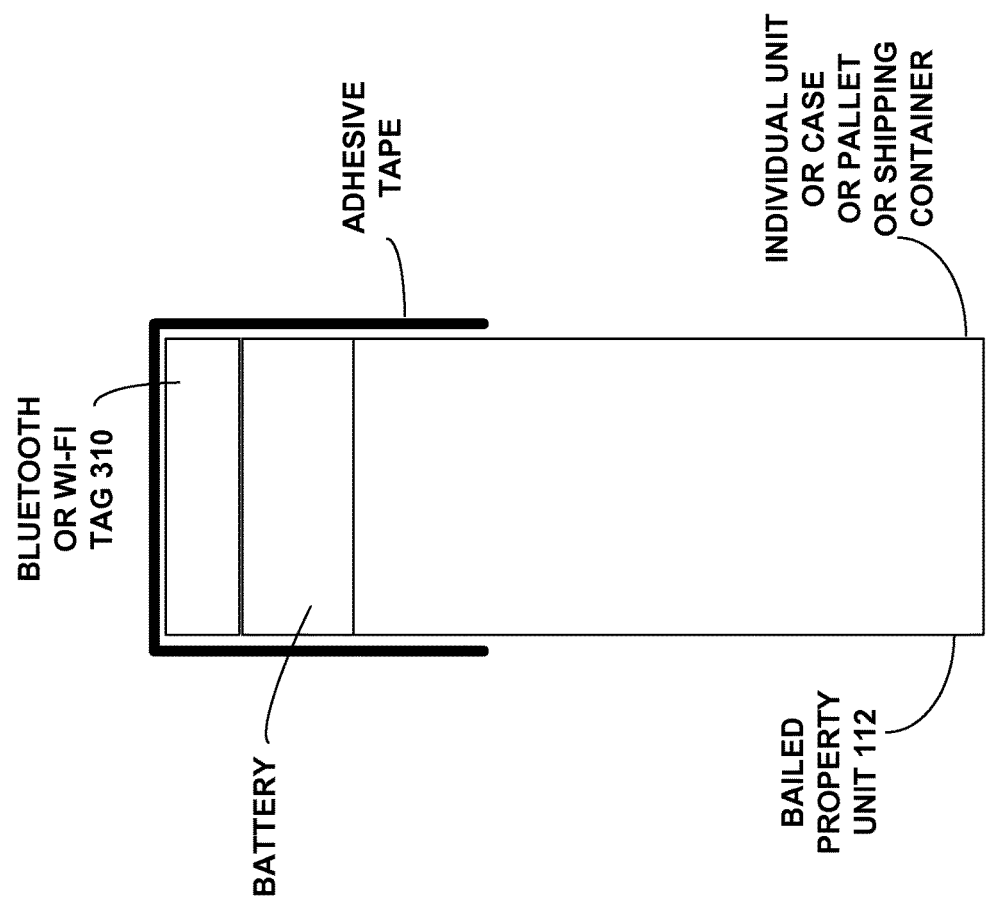
FIG. 4C illustrates an example bailed property unit in FIG. 1A, 2A, or 3, such as an individual wine bottle, a case of bottles, a portable pallet of cases, or a shipping container of pallets, each bailed property unit being tagged for inventory identification with a Bluetooth tag, fastened to the unit.

FIG. 4C illustrates an example bailed property unit 112 in FIG. 1A, 2A, or 3, such as an individual wine bottle, a case of bottles, a portable pallet of cases, or a shipping container of pallets, each bailed property unit being tagged for inventory identification with a Bluetooth tag 310, fastened to the unit.

Figure 5:
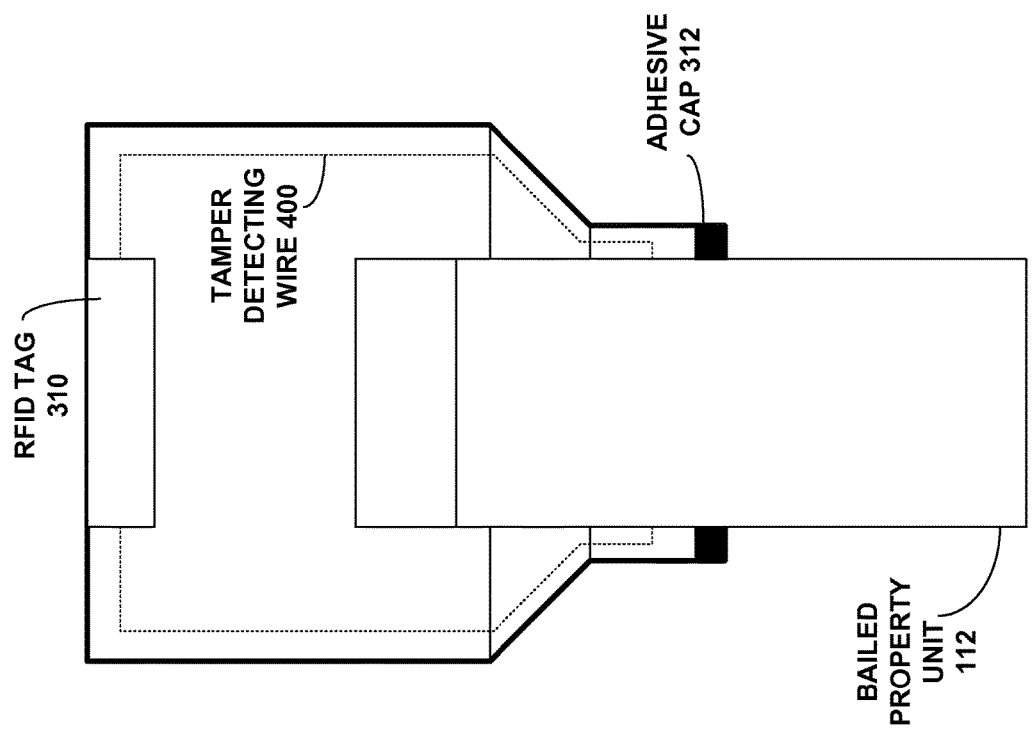
FIG. 5 illustrates an example bailed property unit in FIG. 1A, 2A, or 3, such as an individual wine bottle, each bailed property unit being tagged for inventory identification with an RFID chip and a tamper detecting wire in a cap fastened to the unit.

FIG. 5 illustrates an example bailed property unit 112 in FIG. 1A, 2A, or 3, such as an individual wine bottle, each bailed property unit being tagged for inventory identification with an RFID chip and a tamper detecting wire 400 in a cap 312 fastened by adhesive to the unit. The cap 312 containing the RFID tag 310, is fastened to each of the bailed property units 112. The fastening of the cap to the unit may be by means of an adhesive included in the cap 312. A tamper detecting conductor 400 is coupled to the RFID tag 310 and is fastened to each of the bailed property units 112. The fastening of the conductor 400 to the unit 112 may be by enveloping the conductor in the adhesive material of the cap and adhesively or frictionally engaging the conductor 400 to the surface of the unit 112. The conductor 400 indicates to the RFID tag 310 if the cap 312 is tampered with, thereby causing the RFID tag 310 to output the tampering signal to the RFID detector array 302.

Figure 6:
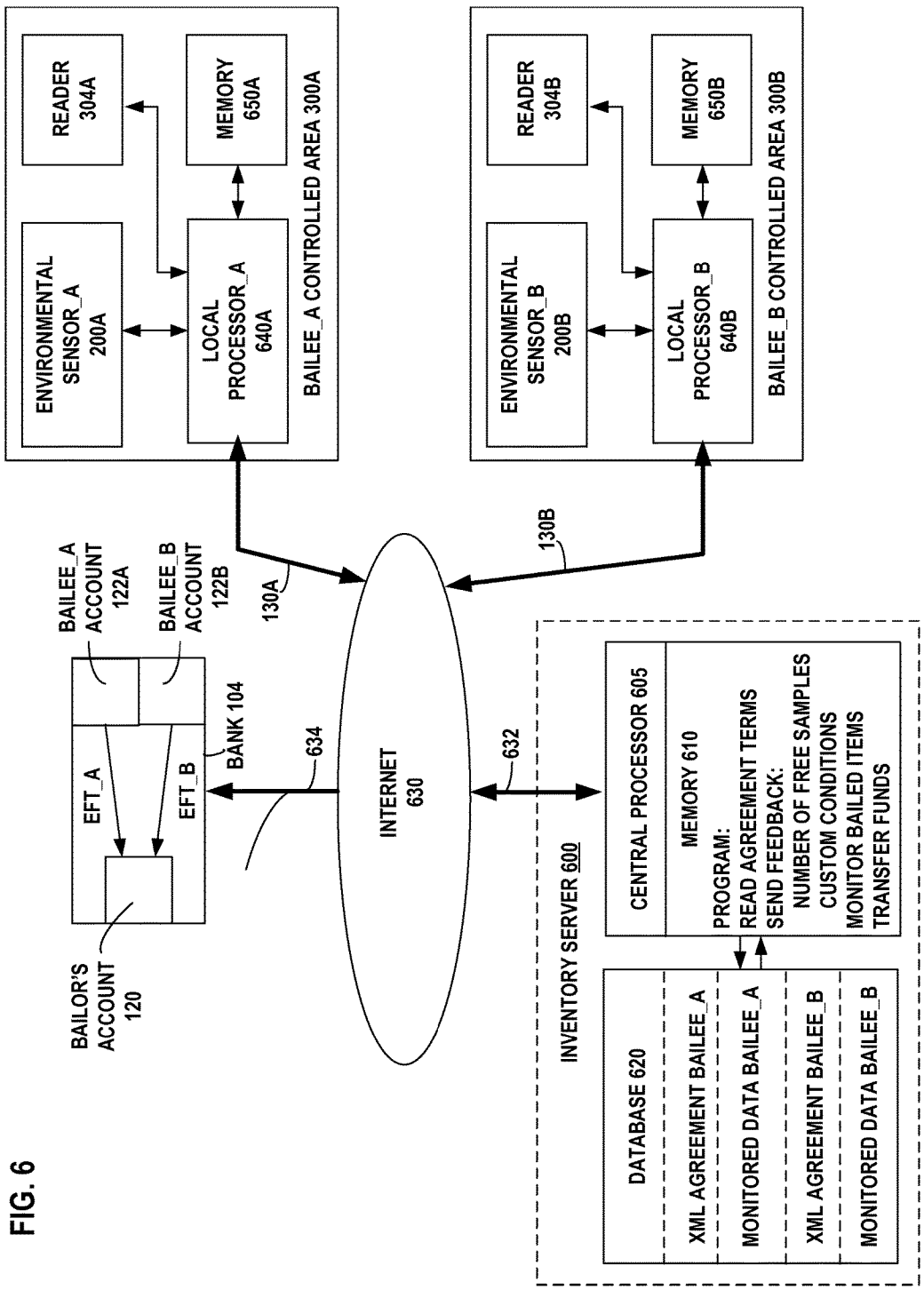
FIG. 6 is a network diagram illustrating an example central server monitoring and controlling a plurality of dealer/bailee controlled areas storing similar types of goods, on behalf of the financing entity/bailor.

FIG. 6 is a network diagram illustrating an example central server 600 monitoring and controlling a plurality of dealer/bailee controlled areas 300A and 300B storing similar types of goods, on behalf of the financing entity/bailor 100.

Each agreement between the bailor 100 and a bailee 102, for example bailee "A", is codified in an XML document. The central processor 605 is programmed to store the XML agreement in the database 620, along with history data of the inventory of bailed property units 112 in the bailee "A"'s controlled area, for example 300A. The bailee's controlled area, for example 300A, includes local processor 640A coupled to environmental sensor 200A, RFID reader 304A, and memory 650A. Similarly, the agreement between the bailor 100 and, for example bailee "B", is codified in an XML document that the central processor 605 is programmed to store in the database 620, along with history data of the inventory of bailed property units 112 in the bailee "B"'s controlled area, for example 300B. The bailee's controlled area, for example 300B, includes local processor 640B coupled to environmental sensor 200B, RFID reader 304B, and memory 650B.

For each bailee, for example bailee "A", the central processor 605 is programmed to read the terms of the agreement between the bailor and the bailee "A" in the XML agreement document. The terms may include a description of the property units 112 to be bailed, the financing terms, the various interest rate levels corresponding to various corresponding factors influencing risk of loss, such as the as duration of the bailment or the environmental conditions and limits in the controlled area 300A during the bailment. The central processor 605 is programmed to send customized terms that were read from the XML agreement document, back to the local processor 640A, environmental sensor 200A, RFID reader 304A, and memory 650A in the controlled area 300A, such as:
  promotions/# of free samples;
  custom conditions/limits.

The central processor 605 is programmed to then monitor the bailed items 112 in the controlled area 300A, based on data reports received from the local processor 640A in the controlled area 300A.

The local processor 640A in the controlled area 300A of bailee "A" is programmed to receive the customized terms from central processor 605, to store the customized terms in the memory 650A and to set the environmental sensor 200A, in accordance with the agreement, such as promotions/number of free samples/custom conditions, such as temperature range for storage.

When the controlled area 300A of bailee "A" receives a property unit 112 with an RFID tag 310 containing property id, name of bailor, and agreement number, the RFID reader 304A reads that information. The local processor 640A in the controlled area 300A of bailee "A" is programmed to record in a memory 650A the time of receipt, property id, name of bailor, and bailment agreement number read by the RFID reader 304A. The local processor 640A in the controlled area 300A of bailee "A" is programmed to continuously monitor and store in memory 650A a record of environmental measurements and times of those measurements in the controlled area 300A during the storage of the property unit 112.

The local processor 640A in the controlled area 300A of bailee "A" is programmed to sequentially query each RFID tag 310 of each property unit 112 to determine if the bailed property 112 is present within the controlled area 300A and to determine if the conductor 400 in the cap 312 is broken, indicating tampering. If tampering is indicated or the property unit 112 is missing from the controlled area 300A of bailee "A" or if adverse environmental conditions have been detected and recorded in the controlled area 300A, then the local processor 640A in the controlled area 300A is programmed to prepare a data report. The data report includes the property id of the property unit 112, the name of bailor, the agreement number, the time of receipt of the property unit 112 in the controlled area 300A, the time that the query was made indicating the property unit was missing or suffered adverse environmental conditions, and the record of environmental measurements. The local processor 640A in the controlled area 300A is programmed to send the data report to the central processor 605.

The central processor 605 is programmed to receive the data report and based on the information therein, to access the XML bailment agreement between the bailor 100 and the bailee "A", stored in the database 620. The central processor 605 is programmed to calculate a price of the property unit 112 based on the terms of the bailment agreement and to calculate interest at variable interest rate with respect to duration of custody by the bailee and the risk-of-loss to the bailor. The central processor 605 is programmed to initiate an electronic funds transfer EFT-A by the bank 104 of the price of property unit 112 and the calculated interest, the funds being transferred from the bailee's account 122A to the bailor's account 120.

Figure 7:
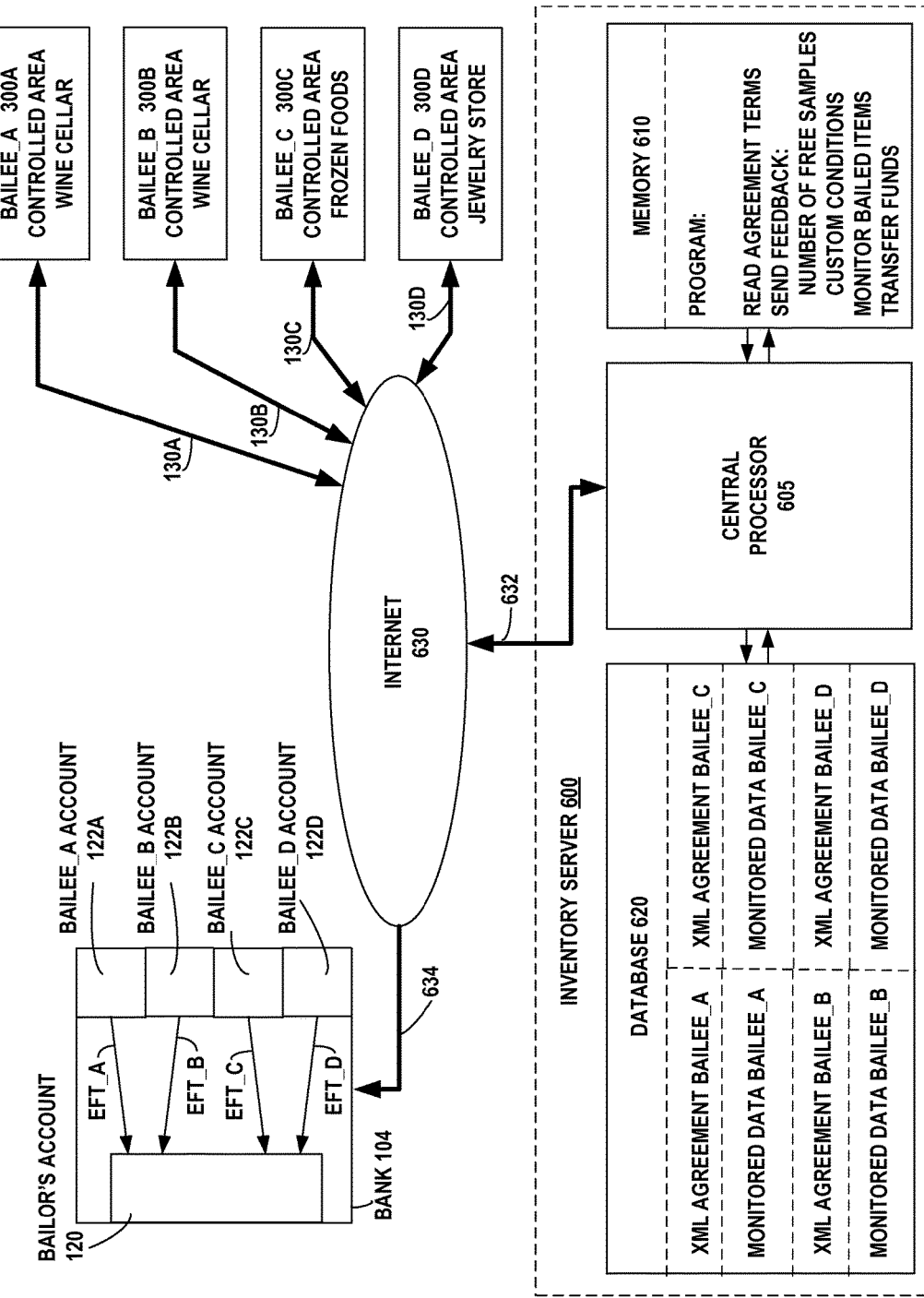
FIG. 7 is a network diagram illustrating an example central server monitoring and controlling a plurality of dealer/bailee controlled areas storing diverse types of goods, on behalf of the financing entity/bailor.

FIG. 7 is a network diagram illustrating an example central server 600 monitoring and controlling a plurality of dealer/bailee controlled areas storing diverse types of goods, on behalf of the financing entity/bailor. Four bailee controlled areas are shown: bailee "A"'s controlled area 300A for a wine cellar, bailee "B"'s controlled area 300B for a wine cellar, bailee "C"'s controlled area 300C for frozen foods, and bailee "D"'s controlled area 300D for a jewelry store. In the example jewelry store, the variable market price of the precious metals in the jewelry makes their duration of storage by the bailee "D" significantly affect the risk of loss to the bailor in the case of tampering or theft of the bailed jewelry.

Figure 8:
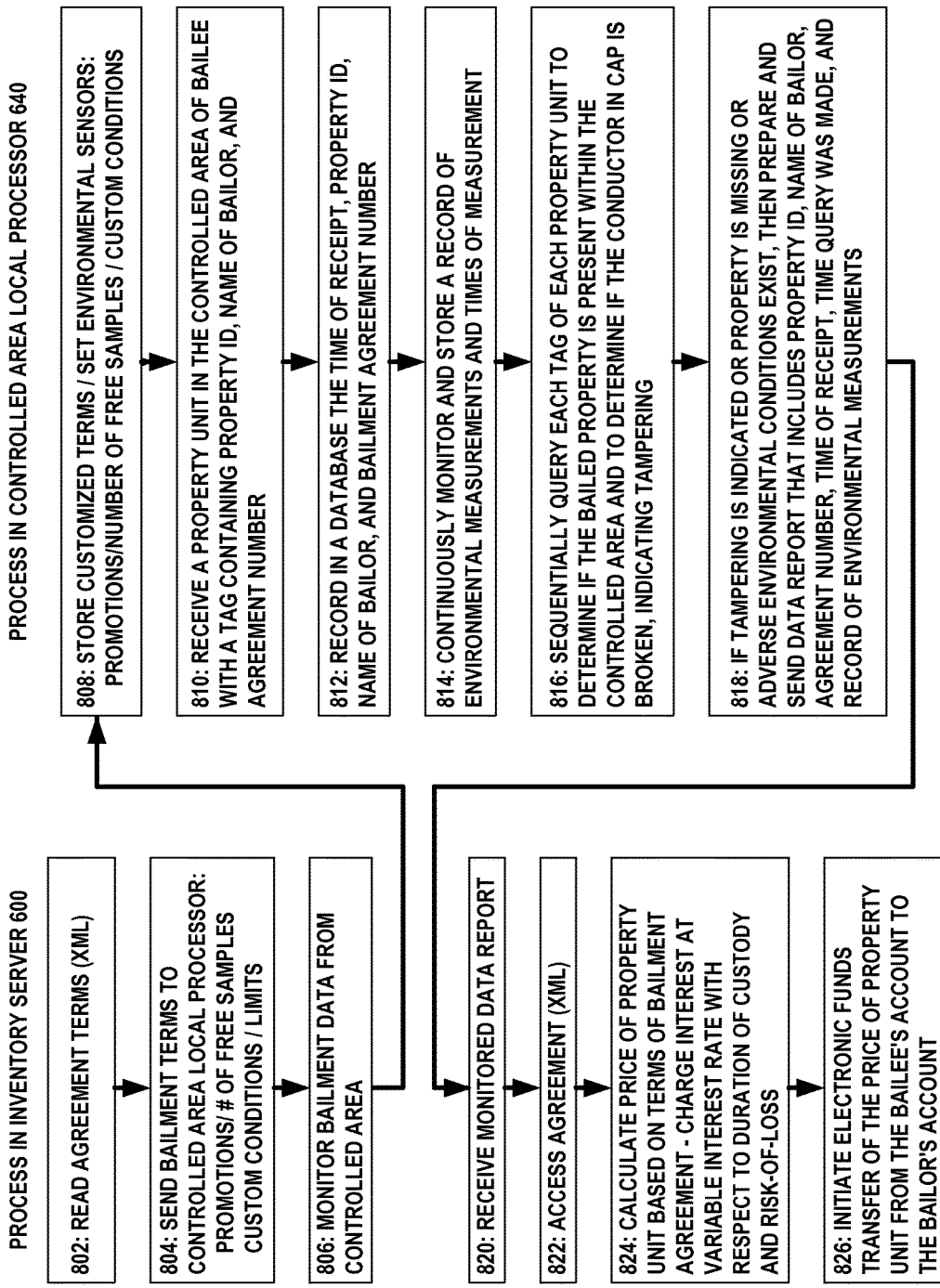
FIG. 8 is a flow diagram of an example process run by the central server and the local processors monitoring and controlling a plurality of dealer/bailee controlled areas.

FIG. 8 is a flow diagram of an example process run by the central processor 605 and the local processors 640A and 640B monitoring and controlling a plurality of dealer/bailee controlled areas 300A and 300B.

The process 800 begins in the central processor 605 with steps 802, 804, and 806:
  Step 802: read agreement terms (XML table)
  Step 804: send feedback-customized terms:
  promotions/# of free samples
  custom conditions/limits
  Step 806: monitor bailed items
  Then process 800 passes to the controlled area local processor 640 with steps 808-818:
  Step 808: store customized terms/set environmental sensors:
    promotions/number of free samples/custom conditions
  Step 810: receive a property unit in the controlled area of bailee with an RFID tag containing property id, name of bailor, and agreement number
  Step 812: record in a database the time of receipt, property id, name of bailor, and bailment agreement number
  Step 814: continuously monitor and store a record of environmental measurements and times of measurement
  Step 816: sequentially query each RFID tag of each property unit to determine if the bailed property is present within the controlled area and to determine if the conductor in cap is broken, indicating tampering
  Step 818: if tampering is indicated or property is missing or adverse environmental conditions exist, then prepare data report that includes property id, name of bailor, agreement number, time of receipt, time query was made, and record of environmental measurements
  Then process 800 passes back to the central processor 605 with steps 820 to 826: Step 820: receive monitored data report.
  Step 822: access bailment agreement (xml)
  Step 824: calculate price of property unit based on terms of bailment agreement—charge interest at variable interest rate with respect to duration of custody and risk-of-loss Step 826: initiate electronic funds transfer of the price of property unit from the bailee's account to the bailor's account.

In embodiments of the invention, the steps of the computer process performed in the central processor 605 of the inventory server 600 represent computer program code instructions stored in the memory 610, which when executed by the central processor 605, carry out the functions of the example embodiments of the invention. The computer program logic may be delivered to the memory 610 from a computer program product or article of manufacture in the form of computer-usable, non-transitory media such as resident memory devices, compact disk read-only memory, or other removable memory devices. The steps of the process may be carried out in another order than shown and individual steps may be combined or separated into component steps. The computer program process steps performed in the inventory server 600 may be summarized as follows:

Receiving in a server an event signal from a reader detecting entry or removal of bailed property units owned by a bailor from a controlled area of a bailee, by detecting a signal from a tag of the bailed property unit, the reader outputting the event signal in accordance with an agreement;

Monitoring by the server the event signals received from the reader, the server having access to terms of the agreement, the server being coupled to a bank having an account of the bailor and an account of the bailee; and Initiating by the server a financial transfer by the bank from the bailee account to the bailor account in accordance with the agreement, based on removal of the bailed property units in the controlled area.

The embodiment of the database 620 shown in FIG. 6 uses an extensible markup language (XML) document to provide a machine readable expression of the terms in the agreement between the financing entity/bailor and bailee, which can be read by the processor 605. Data entry to create the XML document may be typed into a template that has been created by a conventional word processing program, such as Microsoft Word 2007. To specify the agreement, XML tags are used to categorize each type of term in the agreement. The each term is delineated by a beginning tag and an ending tag, forming an element. For example, the element "<NAME>Wine Ventures, Inc.</NAME>" defines the category as "name", and specifies the data as "Wine Ventures, Inc." As another example, the element "<BANKWIRE>123123 </BANKWIRE>" defines the category as "bankwire", and specifies the data as "123123". Another feature of XML is its ability to specify a hierarchy in the categories of data. For example, the bailor is normally specified as both a name of a party to the agreement and a bankwire account address of the party. The categories of data for name and bankwire can be thought of as "child" categories within the category for "bailor". An example XML document expresses this hierarchy as follows:

```
<BAILOR>
    <NAME>Wine Ventures, Inc.</NAME>
    <21 BANKWIRE>123123 </BANKWIRE>
</BAILOR>
```

An example XML document of an agreement between the financing entity/bailor and bailee, with example data values filled in, is shown in the following Table A:

TABLE A

Example of an XML Document Specifying a Bailor/Bailee Agreement

```
<?XML VERSION="1.0"?>
<DOCTYPE BAILOR/BAILEE AGREEMENT_OBJECT
"xml_directory\object.dtd">.
<BAILOR>
    <NAME>Wine Ventures, Inc.</NAME>
    <BANKWIRE>123123 </BANKWIRE>
</BAILOR>
<BAILEE>
    <NAME>The Wine Shoppe </NAME>
    <BANKWIRE>456456</BANKWIRE>
</BAILEE>
<AGREEMENT_NO>
    <NUMBER>123</ NUMBER >
</ AGREEMENT_NO >
<PROPERTY_ DESCRIPTION>
    < DESCRIPTION _1>Bottles XYZ Merlot
    2001</ DESCRIPTION_1 >
        < QUANITY_1>50</ QUANITY_1>
    < DESCRIPTION _2>Bottles XYZ Merlot
    2002</ DESCRIPTION_2 >
        < QUANITY_2>100</ QUANITY_2>
    < DESCRIPTION _3>Bottles ABC Pinot Noir
    2001</ DESCRIPTION_3 >
        < QUANITY_3>150</ QUANITY_3>
</ PROPERTY_ DESCRIPTION >
<STORAGE_ENVIRONMENT >
    < DESCRIPTION _1>Bottles XYZ Merlot
    2001</ DESCRIPTION_1 >
        < TEMPERATURE_1> 55° to
        60°F </ TEMPERATURE _1>
    < DESCRIPTION _2>Bottles XYZ Merlot
    2002</ DESCRIPTION_2 >
        < TEMPERATURE_2> 55° to
        60°F </ TEMPERATURE _2>
    < DESCRIPTION _3>Bottles ABC Pinot Noir
    2001</ DESCRIPTION_3 >
        < TEMPERATURE_3> 55° to
        60°F </ TEMPERATURE _3>
</ STORAGE_ENVIRONMENT >
< FINANCING_TERMS >
    < RISK_OF_LOSS_1> Duration of
    Bailment </RISK_OF_LOSS _1 >
        < INTEREST_RATE_1>2.5%</INTEREST_RATE _1>
    < RISK_OF_LOSS_2>Small Environmental
    Departure </RISK_OF_LOSS _2 >
        < INTEREST_RATE_2>10.0%</INTEREST_RATE _2>
    < RISK_OF_LOSS_3>Large Environmental
    Departure </RISK_OF_LOSS _3 >
        < INTEREST_RATE_3>20.0%</INTEREST_RATE _3>
</FINANCING_TERMS >
< PROMOTIONS>
    < DISCOUNTS> Old Stock</ DISCOUNTS>
        <PERCENTAGE>10%</ PERCENTAGE>
    < FREE_SAMPLES> Old Stock</ FREE_SAMPLES >
        <QUANTITY>2</ QUANTITY>
< /PROMOTIONS>
< ADVERTISING>
    < SEARCH TERM> Wine</ SEARCH TERM>
    < MESSAGE> Specials at The Wine Shoppe</ MESSAGE>
< /ADVERTISING>
< GEOGRAPHIC LIMITS>
    < STATES> Virginia, Maryland, DC</ STATES>
    <COORDINATES> LAT1_,LON1_by
    LAT2_,LON2_ </ COORDINATES >
< / GEOGRAPHIC LIMITS >
```

A template created for data entry of the agreement term values into the above example XML document of Table A, is shown in the following Table B:

| AGREEMENT TERM | TYPE IN VALUE |
|---|---|
| BAILOR NAME | Wine Ventures, Inc. |
| BAILOR BANKWIRE | 123123 |
| BAILEE NAME | The Wine Shoppe |

-continued

| AGREEMENT TERM | TYPE IN VALUE |
|---|---|
| BAILEE BANKWIRE | 456456 |
| AGREEMENT NUMBER | 123 |
| PROPERTY DESCRIPTION_1 | Bottles XYZ Merlot 2001 |
| QUANITY_1 | 50 |
| PROPERTY DESCRIPTION_2 | Bottles XYZ Merlot 2002 |
| QUANITY_2 | 100 |
| PROPERTY DESCRIPTION | Bottles ABC Pinot Noir 2001 |
| QUANITY_3 | 150 |
| STORAGE_ENVIRONMENT | |
| DESCRIPTION_1 | Bottles XYZ Merlot 2001 |
| TEMPERATURE_1 | 55° to 60° F. |
| DESCRIPTION_2 | Bottles XYZ Merlot 2002 |
| TEMPERATURE_2 | 55° to 60° F. |
| DESCRIPTION_3 | Bottles ABC Pinot Noir 2001 |
| TEMPERATURE_3 | 55° to 60° F. |
| FINANCING_TERMS | |
| RISK_OF_LOSS_1 | Duration of Bailment |
| INTEREST_RATE_1 | 2.5% |
| RISK_OF_LOSS_2 | Small Environmental Departure |
| INTEREST_RATE_2 | 10.0% </ |
| RISK_OF_LOSS_3 | Large Environmental Departure |
| INTEREST_RATE_3 | 20.0% |
| DISCOUNTS PERCENTAGE | 10% |
| FREE_SAMPLES QUANTITY | 2 |
| ADVERTISING SEARCH TERM | Wine |
| ADVERTISING MESSAGE | Specials at The Wine Shoppe |
| GEOGRAPHIC LIMITS - STATES | Virginia, Maryland, DC |
| GEOGRAPHIC COORDINATES | LAT1_, LON1_by LAT2_, LON2_ |

By expressing the terms in the agreement in XML, the stored expression is both human and machine readable by the processor 605, it defines the content, and it defines the hierarchical structure of the content. XML also separates the appearance of the content from the structure of the content, so that the content can be displayed in any format by using customized style sheets in each different type of display device. Extensible Stylesheet Language (XSL) can provide flexible document presentation, enabling the content of an XML document to be displayed on the display screen of a personal computer.

The XML document is parsed and stored in the database 620 as a hierarchical tree of objects that the program running in the processor 605 can randomly access. A document type definition (DTD) stored in the server 600 is a set of declarations that specify the allowed order, structure, and meaning of the tags for the XML document. Standard XML parsers are part of most operating systems now available. A document type declaration element is included in the XML document to indicate the DTD to which the XML document complies and where to find it. It starts with "<DOCTYPE" and ends with ">". The example given below is
    <DOCTYPE OBJECT "xml_directory\object.dtd">.

Each XML file begins with a processing instruction that gives information to an XML processor in the server 600. It starts with "<?" and ends with ">". The example given below is <?XML VERSION"1.0"?>.

The inventory server 600 is programmed to feedback control information to the local processor 640, memory 650, reader 304, environmental sensor 200, and GPS unit 301, in accordance with the XML encoded financing/bailment agreement. Each controlled area may have a different type of bailed property unit stored, requiring different settings for temperature limits, other environmental limits, geographic limits for exclusive retailing rights of the bailee, conditions for storage, and the like, in accordance with the agreement.

Example feedback control information from the inventory server 600 is shown in the following Table C:

| CONTROL INFORMATION | VALUES |
|---|---|
| STORAGE_ENVIRONMENT | |
| DESCRIPTION_1 | Bottles XYZ Merlot 2001 |
| TEMPERATURE_1 | 55° to 60° F. |
| DESCRIPTION_2 | Bottles XYZ Merlot 2002 |
| TEMPERATURE_2 | 55° to 60° F. |
| DESCRIPTION_3 | Bottles ABC Pinot Noir 2001 |
| TEMPERATURE_3 | 55° to 60° F. |
| FREE_SAMPLES QUANTITY | 2 |
| GEOGRAPHIC LIMITS - STATES | Virginia, Maryland, DC |
| GEOGRAPHIC COORDINATES | LAT1_, LON1_by LAT2_, LON2_ |

The local processor 640 in the controlled area 300 of the bailee is programmed to sequentially query each tag 310 of each property unit 112 to determine if the bailed property 112 is present within the controlled area 300 and to determine if tampering has occurred. If tampering is indicated or the property unit 112 is missing from the controlled area 300 of bailee or if adverse environmental conditions have been detected and recorded in the controlled area 300, then the local processor 640 in the controlled area 300 is programmed to prepare a data report. The data report includes the property id of the property unit 112, the name of bailor, the agreement number, the time of receipt of the property unit 112 in the controlled area 300, the time that the query was made indicating the defect, such as property unit was missing or suffered adverse environmental conditions, the record of environmental measurements, and a record of geographic locations where each measurement was made. The local processor 640 in the controlled area 300 is programmed to send the data report to the central processor 605 of the inventory server 600. An example of the data report to the inventory server 600 is shown in the following Table D:

| DATA REPORT | VALUES |
|---|---|
| PROPERTY TAG ID | 321 |
| BAILOR | Wine Ventures, Inc |
| BAILEE | The Wine Shoppe |
| AGREEMENT NUMBER | 123 |
| TIME PROPERTY RECEIVED | Jan. 25, 2011 |
| TIME OF DETECTED DEFECT | Feb. 27, 2011 |
| RECORD OF MEASUREMENTS | Table of hour by hour record of temperatures in controlled area |
| RECORD OF LOCATIONS | Table of hour by hour record of location of bailed property |
| MONITORED DATA | 25 Bottles XYZ Merlot 2001 |
| | 50 Bottles XYZ Merlot 2002 |
| | 75 Bottles ABC Pinot Noir 2001 |

Figure 9:
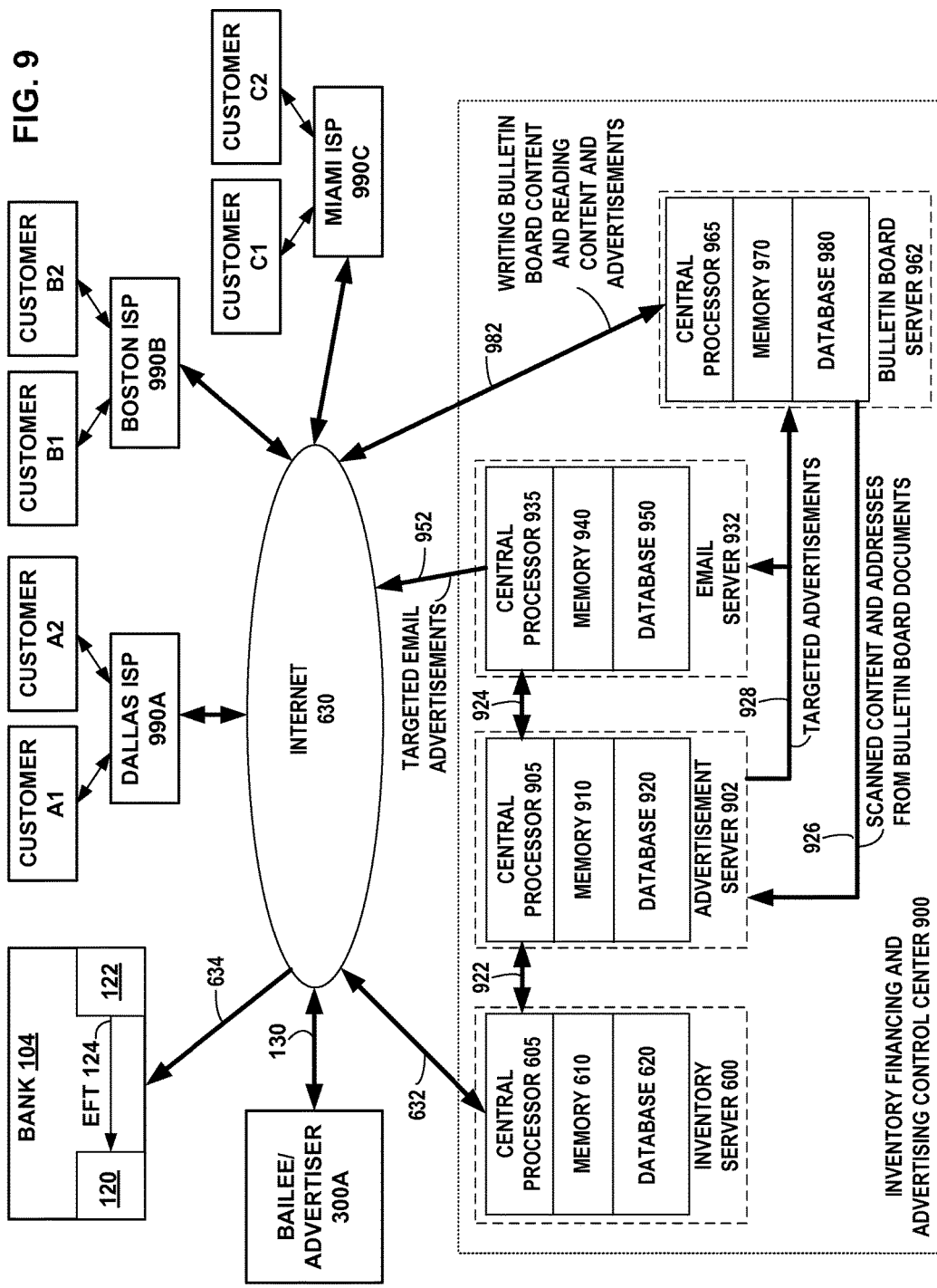
FIG. 9 is an example system and network diagram of an inventory financing and advertising control center for collecting the retailer's data accumulated by the inventory server and using that data to prepare targeted advertisements of the retailer's inventory. The targeted ads are distributed by a bulletin board server or in emails.

FIG. 9 is an example system and network diagram of an inventory financing and advertising control center 900 for collecting over line 130 from the controlled area 300, the bailee/retailer's data accumulated by the inventory server 600 and using that data to prepare targeted advertisements in the advertisement server 902, of the bailee/retailer's inventory in the controlled area 300, for distribution to the bailee/retailer's customers. The targeted ads are distributed by a bulletin board server 962 or by an email server 932 using the customer's email address. The targeted ads may also be distributed by the advertisement server 902 over the public switched telephone network using the Short Message Service (SMS) to send text messages to a customer's cell phone, such as an iPhone™, using the customer's telephone number. The advertisement server 902 may be connected to an SMS aggregator that connects to the short message service center (SMSC) of the mobile telephone network carrier. Alternately, the advertisement server 902 may include an external short message entity (SME) that connects to the mobile network SMSC. The text of the targeted advertisements, which may be limited to 160 characters, is transmitted by the advertisement server 902 through either the aggregator or the SME to the mobile network SMSC, and then the SMSC transmits the targeted advertisement text message to the customer's cell phone. For email, the targeted advertisements are sent by the email server 932 over line 952 and the Internet 630 to, for example, Internet service providers (ISPs) 990A in Dallas, 990B in Boston, and 990C in Miami. Customers A1 and A2 are connected to the Internet by the ISP 990A in Dallas. Customers B1 and B2 are connected to the Internet by the ISP 990B in Boston. Customers C1 and C2 are connected to the Internet by the ISP 990C in Miami. The targeted ads are distributed over line 982 and the Internet 630, by a bulletin board server 962, such as the FaceBook™ social networking Internet site.

Figure 10:
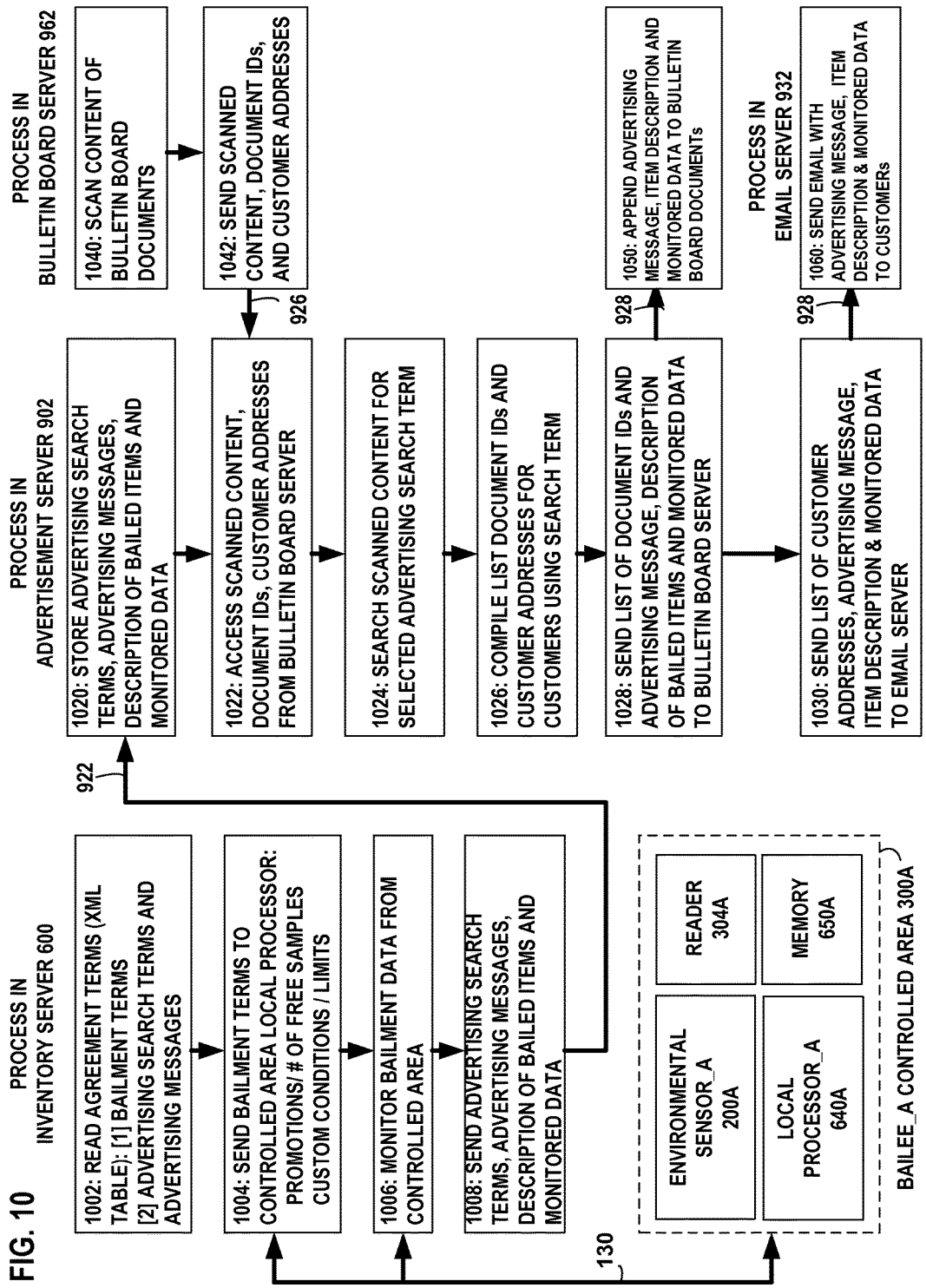
FIG. 10 is a flow diagram of an example process run by the inventory server, advertisement server, bulletin board server, and email server to prepare targeted advertisements of the bailee/retailer's inventory based on the monitored date from the bailee/retailer's controlled area, the targeted advertisements being distributed by the bulletin board server or in emails.

FIG. 10 is a flow diagram of an example process run by the inventory server 600, advertisement server 902, bulletin board server 962, and email server 932 to prepare targeted advertisements of the bailee/retailer's inventory based on the monitored data from the bailee/retailer's controlled area 300, the targeted advertisements being distributed by the bulletin board server 962 or the email server 932.

The process in inventory server 600 is as follows:

Step 1002: read agreement terms (xml table): [1] bailment terms and [2] advertising search terms and advertising messages.

Step 1004: send bailment terms to controlled area local processor:
promotions/# of free samples
custom conditions/limits.

Step 1006: monitor bailment data from controlled area.

Step 1008: send advertising search terms, advertising messages, description of bailed items and monitored data.

The process in advertisement server 902 is as follows:

Step: 1020: store advertising search terms, advertising messages, description of bailed items and monitored data.

Step 1022: access scanned content, document ids, and customer addresses from bulletin board server.

Step 1024: search scanned content for selected advertising search term.

Step 1026: compile list document ids and customer addresses for customers using search term.

Step 1028: send list of document ids and advertising message, description of bailed items and monitored data to bulletin board server.

Step 1030: send list of customer addresses, advertising message, item description & monitored data to email server.

Process in the bulletin board server 962 is as follows:

Step 1040: scan content of bulletin board documents.

Step 1042: send scanned content, document ids, and customer addresses.

Step 1050: append advertising message, item description and monitored data to bulletin board documents.

The process in the email server 932 is as follows:

Step 1060: send email with advertising message, item description & monitored data to customers.

The targeted advertisements of the bailee's inventory may also be distributed by advertisement server 902 over a telephone network using the Short Message Service (SMS) to send text messages.

In embodiments of the invention, the steps of the computer process performed in the central processor 605 of the inventory server 600 and the central processor 905 of the advertisement server 902 represent computer program code instructions stored in the respective memories 610 and 910, which when executed by the respective processors 605 and 905, carry out the functions of the example embodiments of the invention. The computer program logic may be delivered to the memories 610 and 910 from a computer program product or article of manufacture in the form of computer-usable, non-transitory media such as resident memory devices, compact disk read-only memory, or other removable memory devices. The steps of the process may be carried out in another order than shown and individual steps may be combined or separated into component steps. The computer program process steps performed in the inventory server 600 and advertisement server 902 may be summarized as follows:

receiving in a first server an event signal from a reader device detecting entry or removal of bailed property units owned by a bailor from a controlled area of a bailee, by detecting a signal from a tag of the bailed property unit, the reader outputting the event signal in accordance with an agreement;

accessing by the first server terms of the agreement, the first server being coupled to one or more banks having an account of the bailor and an account of the bailee;

initiating by the first server a financial transfer by the one or more banks from the bailee account to the bailor account in accordance with the agreement, based on removal of the bailed property units in the controlled area; and collecting data with a second server coupled to the first server, based on the event signals received by the first server and using the data to prepare targeted advertisements of the bailee's inventory in the controlled area, in accordance with the agreement.

Figure 11:
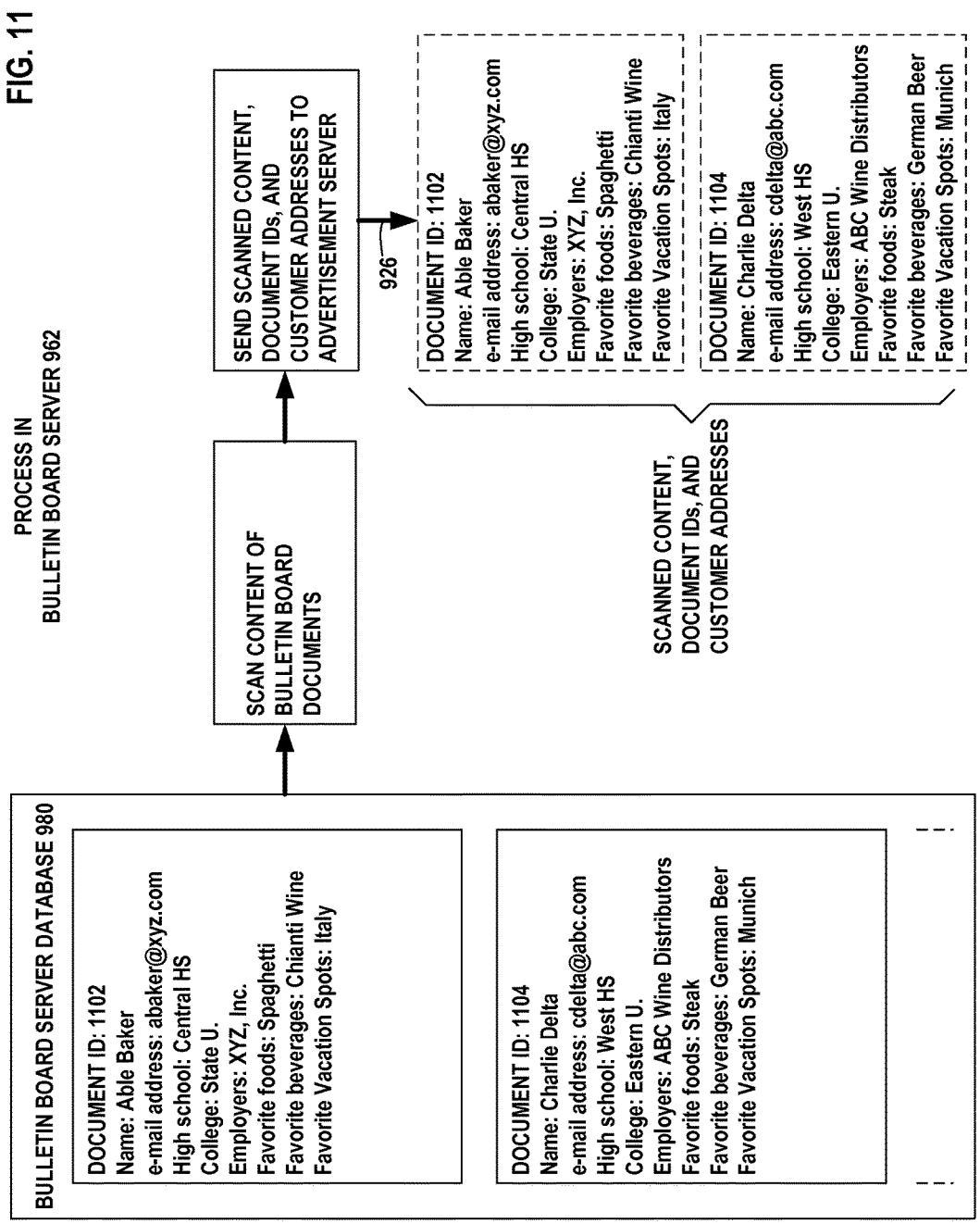
FIG. 11 is a flow diagram of an example process run by the bulletin board server to generate scanned content, document ids, and customer addresses of the bulletin board documents stored in the bulletin board server database, the scanned information being available for access by the advertising server.

FIG. 11 is a flow diagram of example process steps 1040 and 1042 of FIG. 10, run by the bulletin board server 962 to generate scanned content, document IDs, and customer addresses of the bulletin board documents 1102 and 1104 stored in the bulletin board server database 980, the scanned information being available for access over path 926 by the advertising server 902.

The bulletin board server 962 is a computer system running software that allows users to connect and log in to the bulletin board server database 980 using a terminal program running on a personal computer or cellular telephone, such as an iPhone™. Once logged in, a user can perform functions such as uploading and downloading software and data, reading news and bulletins, and exchanging text messages, photographs, video recordings, music files and voice files with other users, either through electronic mail or on an Internet web site message board. Examples of an application running on the bulletin board server 962 include a social networking service enabling an interaction over the Internet by a group of people who share a common interest. Examples of a social networking service include network groups such as Facebook™ and Twitter™, that enable networking and communication between individuals and between consumers and businesses.

FIG. 11 shows two bulletin board documents 1102 and 1104 stored in the bulletin board server database 980, for example in the form of ASCII character files. Document ID 1102 has been entered in database 980 by a first user, Able Baker, and includes the user's e-mail address, telephone number, and various personal facts. Of particular significance for this example is the recorded personal fact that the first user has named "Chianti Wine" as a Favorite beverages. Document ID 1104 has been entered in database 980 by a second user, Charlie Delta, and includes the user's e-mail address, telephone number, and various personal facts. Of particular significance for this example is the recorded personal fact that the second user has named "ABC Wine Distributors" as an employer.

FIG. 11 shows the bulletin board server 962 scanning the content of bulletin board documents 1102 and 1104, in this example by forming a character stream of the ASCII character files 1102 and 1104, which include their content, document IDs, and customer addresses. The scanned content, document IDs, and customer addresses is sent over path 926 to advertisement server 902 in FIG. 12.

Figure 12:
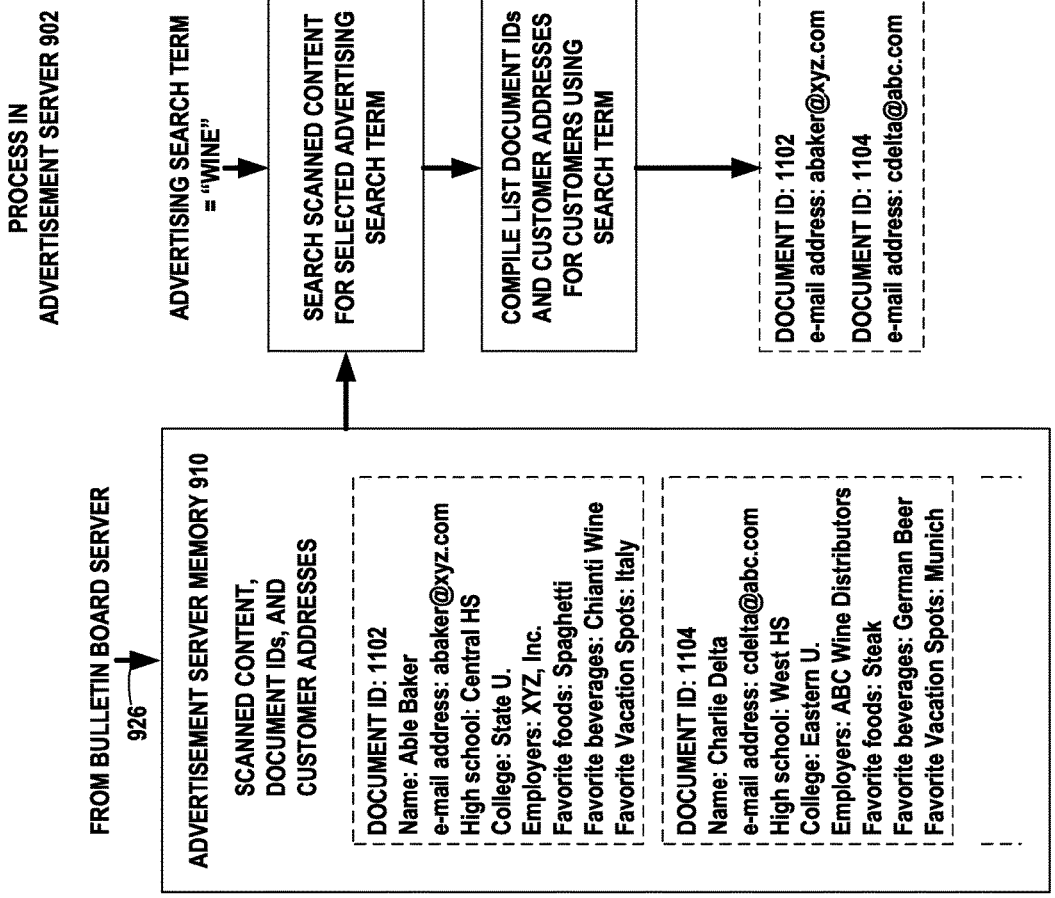
FIG. 12 is a flow diagram of an example process run by the advertisement server receiving the scanned information from the bulletin board server and generating a list of document ids for a targeted advertising message, descriptions of the bailed items, and the monitored data from the bailee/retailer's controlled area, the generated information being returned to the bulletin board server and also to the email server.

FIG. 12 is a flow diagram of example process steps 1020 to 1030 of FIG. 10, run by the advertisement server 902, which receives over path 922 advertising search terms, advertising messages, description of bailed items and monitored data from the inventory server 600 and which further receives over path 926 the scanned information from the bulletin board server 962, the advertisement server 902 generating a list of document IDs 1102 and 1104 for a targeted advertising message, descriptions of the bailed items, and the monitored data from the bailee/retailer's controlled area 300, the generated information being returned over path 928 to the bulletin board server 962 and also to the email server 932.

FIG. 12 shows advertisement server memory 910 receiving from the bulletin board server over path 926 the character stream of the ASCII character files 1102 and 1104, which include their content, document IDs, and customer addresses. The example of an XML document of table A specifying a Bailor/Bailee agreement, includes agreed to terms for the advertising search term as "Wine" and the agreed to advertising message as "Specials at The Wine Shoppe". The XML document further includes agreed terms for description of bailed items as "XYZ Merlot 2001 $25 ea", "XYZ Merlot 2002 $22 ea", and "ABC Pinot Noir 2001 $40 ea". The local processor 640 in the controlled area 300 sends the data report, including the monitored data, to the central processor 605 of the inventory server 600. In this example, the memory 610 of the inventory processor 600 stores the current state of the monitored data as "25 Bottles XYZ Merlot 2001", "50 Bottles XYZ Merlot 2002", and "75 Bottles ABC Pinot Noir 2001". The advertisement server 902 receives over path 922 from the inventory server 600 the advertising search term "Wine", the advertising message "Specials at The Wine Shoppe", the description of bailed items and monitored data.

FIG. 12 shows the advertisement server 902 searches the scanned content for selected advertising search term "Wine". The advertisement server 902 compiles a list of document IDs and customer addresses for customers whose bulleting board documents use the search term "Wine". In this example the two documents 1102 and 1104 satisfy the search and are listed with their document IDs, email addresses, and telephone numbers.

FIG. 12 shows the advertisement server 902 sending the list of document IDs and advertising message, description of bailed items and monitored data to bulletin board server 962. The advertisement server 902 sends the list of customer addresses, advertising message, item description and monitored data to email server 932. The advertisement server 902 sends the list of customer telephone numbers, advertising message, item description and monitored data over the public switched telephone network using the Short Message Service (SMS) to send text messages to a customer's cell phone, using the customer's telephone number.

Figure 13:
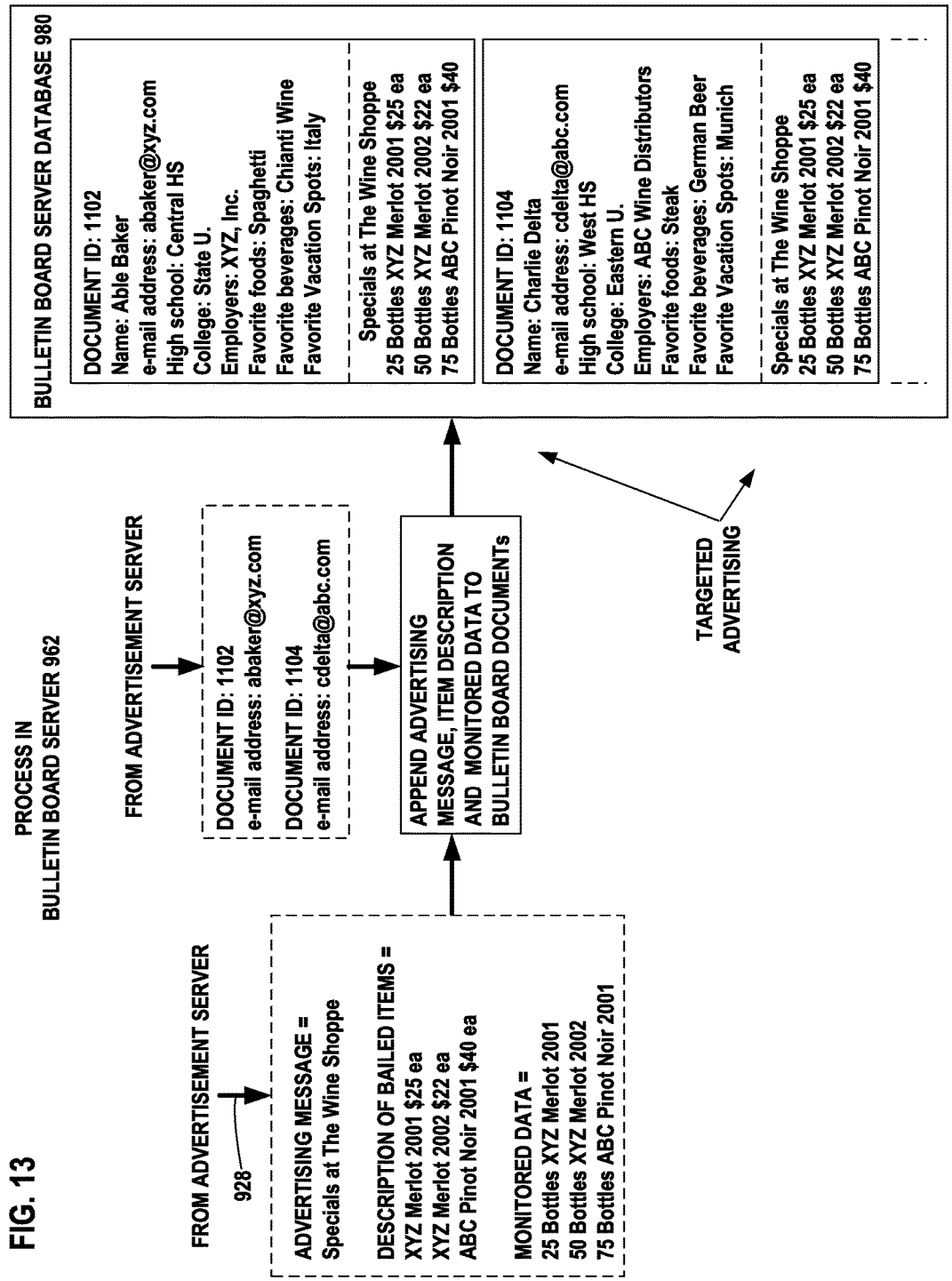
FIG. 13 is a flow diagram of an example process run by the bulletin board server to append the targeted advertising message, item description and the monitored data to bulletin board documents.

FIG. 13 is a flow diagram of example process step 1050 of FIG. 10, run by the bulletin board server 962 to receive the generated information over path 928 and to append the targeted advertising message, item description and the monitored data to bulletin board documents 1102 and 1104.

FIG. 13 shows the bulletin board server 962 receiving from the advertisement server 902 over path 928 the list of document IDs and advertising message, description of bailed items and monitored data. The bulletin board server 962 appends as targeted advertisements, the advertising message, item description and monitored data to each of the identified bulletin board documents 1102 and 1104 in the bulletin board server database 980. When the respective users Able Baker and Charlie Delta access their accounts in the bulletin board server 962, they will see the target advertisements on their documents 1102 and 1104.

Figure 14:
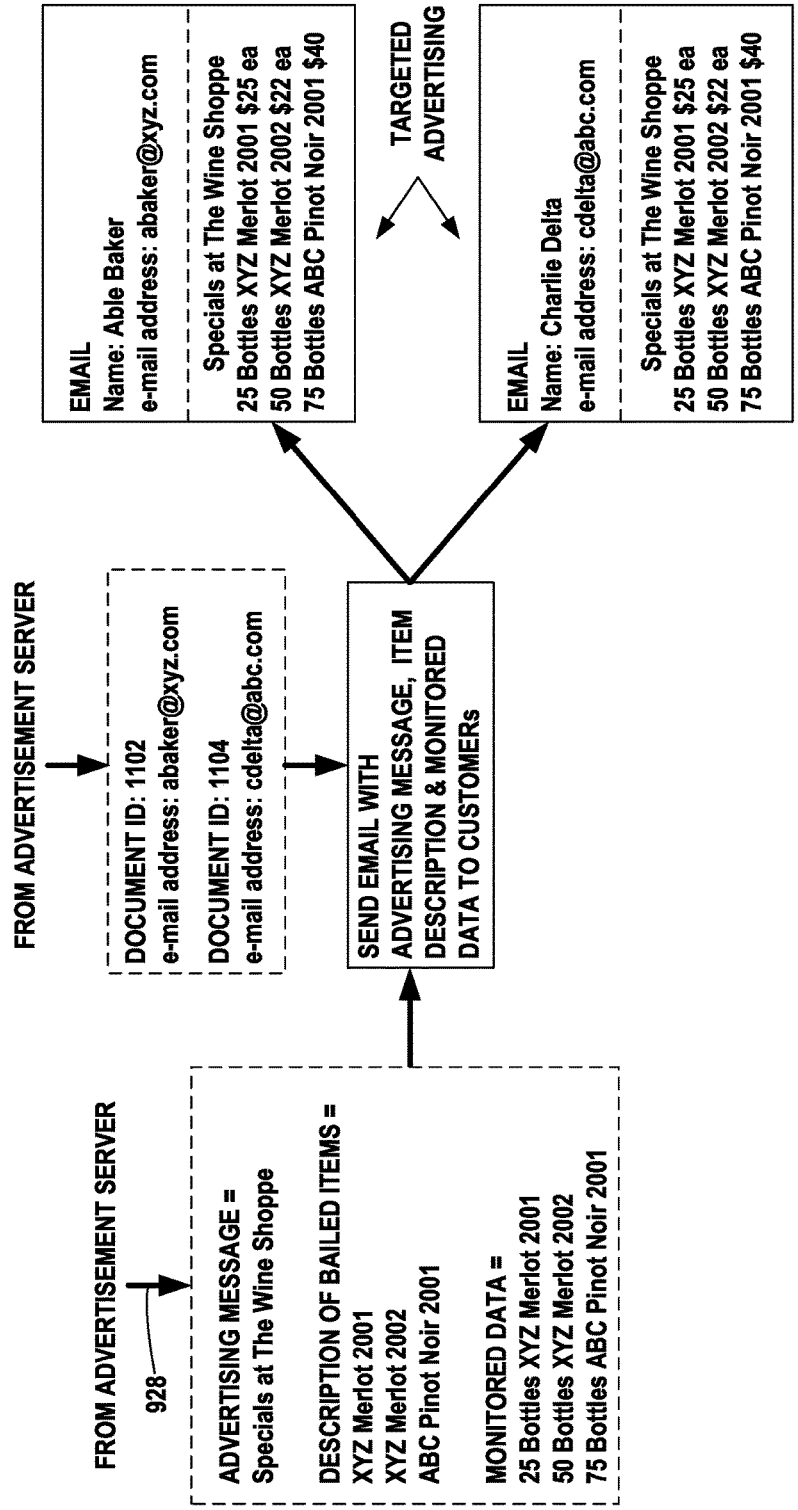
FIG. 14 is a flow diagram of an example process run by the email server to send the targeted advertising message, item description and the monitored data as an email message to a customer.

FIG. 14 is a flow diagram of example process step 1060 of FIG. 10, run by the email server 932 to receive the generated data over path 928 and to send the targeted advertising message, item description and the monitored data over path 952 as email messages to customers, such as Able Baker and Charlie Delta.

FIG. 14 shows the email server 932 receiving from the advertisement server 902 over path 928 the list of document IDs and advertising message, description of bailed items and monitored data. The email server 932 sends emails with the targeted advertisements including the advertising message, item description and monitored data to each of the user email addresses identified in the bulletin board documents 1102 and 1104 in the bulletin board server database 980. When the respective users Able Baker and Charlie Delta receive their emails, they will see the target advertisements.

Figure 15:
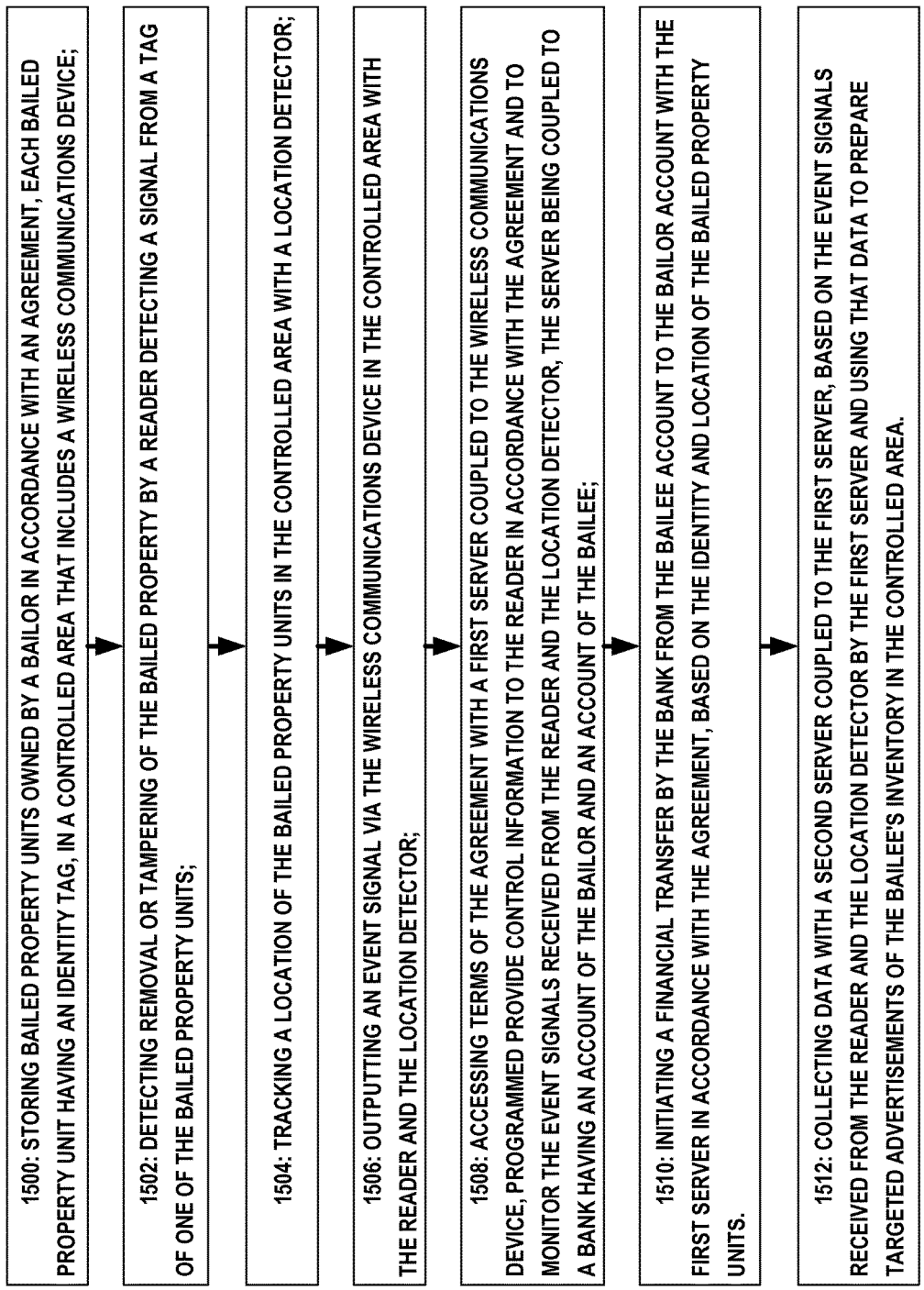
FIG. 15 is a flow diagram of an example process that includes the inventory server 600 and advertisement server 902, to use the monitored location data from the GPS unit to initiate a financial transfer by the bank and to prepare targeted advertisements.

FIG. 15 is a flow diagram of an example process that includes the inventory server 600 and advertisement server 902, to use the monitored location data from the tag reader 304 and the GPS unit 301 to initiate a financial transfer by the bank from the bailee account to the bailor account and to prepare targeted advertisements of the bailee/retailer's inventory based on the monitored data from the bailee/retailer's controlled area 300, the targeted advertisements being distributed by the bulletin board server 962 or the email server 932. The process includes the steps of:

Step 1500: storing bailed property units owned by a bailor in accordance with an agreement, each bailed property unit having an identity tag, in a controlled area that includes a wireless communications device;

Step 1502: detecting removal or tampering of the bailed property by a reader detecting a signal from a tag of one of the bailed property units;

Step 1504: tracking a location of the bailed property units in the controlled area with a location detector;

Step 1506: outputting an event signal via the wireless communications device in the controlled area with the reader and the location detector;

Step 1508: accessing terms of the agreement with a first server coupled to the wireless communications device, programmed provide control information to the reader in accordance with the agreement and to monitor the event signals received from the reader and the location detector, the server being coupled to a bank having an account of the bailor and an account of the bailee;

Step 1510: initiating a financial transfer by the bank from the bailee account to the bailor account with the first server in accordance with the agreement, based on the identity and location of the bailed property units.

Step 1512: collecting data with a second server coupled to the first server, based on the event signals received from the reader and the location detector by the first server and using that data to prepare targeted advertisements of the bailee's inventory in the controlled area.

In embodiments of the invention, the steps of the computer process performed in the central processor 605 of the inventory server 600 and the central processor 905 of the advertisement server 902 represent computer program code instructions stored in the respective memories 610 and 910, which when executed by the respective processors 605 and 905, carry out the functions of the example embodiments of the invention. The computer program logic may be delivered to the memories 610 and 910 from a computer program product or article of manufacture in the form of computer-usable, non-transitory media such as resident memory devices, compact disk read-only memory, or other removable memory devices. The steps of the process may be carried out in another order than shown and individual steps may be combined or separated into component steps. The computer program process steps performed in the inventory server 600 and advertisement server 902 may be summarized as follows:

receiving in a first server a wireless event signal from a reader device associated with a portable platform of a bailee, detecting removal of bailed property units stored on the platform, by detecting a signal from a tag of at least one of the bailed property units, the bailed property units owned by a bailor in accordance with an agreement between the bailor and the bailee;

receiving in the first server a wireless location information signal from a location detector associated with the portable platform indicating a location of the platform in a controlled area;

accessing by the first server terms of the agreement, the first server being coupled to one or more banks having an account of the bailor and an account of the bailee; and initiating by the first server a financial transfer by the one or more banks from the bailee account to the bailor account in accordance with the agreement, in response to the received event signal and location information signal.

The example embodiments of the invention provide for efficient financial transfer of funds from the bailee account to the bailor account in accordance with their agreement on the entry or removal of the bailed property units in the controlled area. The server is programmed to initiate the financial transfer by the bank from the bailee account to the bailor account, based on duration of custody, environmental conditions, theft, or tampering of the bailed property units in the controlled area. The inventory financing and advertising control center collects the bailee/retailer's data accumulated by the inventory server and uses that data to prepare targeted advertisements of the retailer's inventory. The targeted ads are distributed by a bulletin board server or in emails.

Although examples of specific embodiments of the invention have been disclosed, it will be apparent to persons of skill in the art that changes may be made to those examples of specific embodiments without departing from the scope of the claimed invention.

What is claimed is:

1. A method for automatically controlling environmental sensors for monitoring an inventory of bailed property units, comprising:
    detecting, by an array of RFID detectors distributed in a controlled area, entry, removal, or tampering of the bailed property units by detecting RFID signals from RFID tags on the bailed property units;
    measuring, by environmental sensors in the controlled area, ambient environmental conditions experienced by the bailed property units in the controlled area;
    communicating, by a wireless transceiver in the controlled area, with an inventory server;
    performing, by a local processor and a memory in the controlled area, coupled to the RFID detectors, the environmental sensors, and the wireless transceiver, the steps of:
    (a) setting the environmental sensors to measure custom conditions, such as temperature range for storage in the controlled area, the settings being received from the inventory server;
    (b) continuously monitoring and storing in the memory a record of environmental measurements and times of those measurements in the controlled area during the storage of the property unit;
    (c) sequentially querying the RFID tags of the property units to determine whether the property units are present or tampering is indicated with within the controlled area;
    (d) when tampering is indicated or a property unit is missing from the controlled area or if excessive environmental conditions are measured outside a threshold range in the controlled area, preparing a data report identifying the property unit, a time when the property unit was indicated as missing, tampered with, or experienced the measured environmental conditions; and
    (e) transmitting the data report as an event signal to the inventory server.

2. The method of claim 1, further comprising:
    accessing by the server, terms of an agreement between a bailor and a dealer/bailee corresponding to bailed property units owned by the bailor and stored in the controlled area of the dealer/bailee;
    transmitting by the server, customized terms including settings for the environmental sensors to measure custom conditions, such as temperature range for storage in the controlled area, in accordance with the agreement, to a local processor coupled to a reader device and the environmental sensors at the controlled area, to establish settings for the reader device and control the environmental sensors, corresponding to a type of event in accordance with the agreement;
    automatically receiving in the server a real-time event signal from the local processor in response to the reader device-detecting entry or removal of bailed property units owned by the bailor from the controlled area of dealer/bailee, by detecting a signal from a tag of the bailed property unit, the local processor outputting the real-time event signal in accordance with the agreement;
    accessing by the server terms of the agreement, the server being coupled to one or more banks having an account of the bailor and an account of the dealer/bailee; and
    initiating by the server a real-time financial transfer by the one or more banks from the dealer/bailee account to the bailor account in accordance with the agreement, based on the real-time event signal indicating entry or removal of the bailed property units in the controlled area.

3. The method of claim 2, wherein the server is programmed to provide control information to the reader in accordance with the agreement.

4. The method of claim 2, wherein the server is programmed to initiate a financial transfer by the one or more banks from the bailee account to the bailor account in accordance with the agreement, based on duration of custody, removal, theft, damage, or tampering of the bailed property units in the controlled area.

5. The method of claim 2, further comprising:
receiving in the server an environmental signal associated with the event signal, from an environmental sensor detecting ambient environmental conditions associated with the controlled area; and
initiating a financial transfer by the one or more banks from the bailee account to the bailor account with the server in accordance with the agreement, based on detected deviations from an agreed range of environmental conditions in the controlled area.

6. The method of claim 5, further comprising:
calculating by the server a price of a bailed property unit associated with the financial transfer, in accordance with terms of the agreement.

7. The method of claim 5, further comprising:
charging by the server interest at a variable interest rate with respect to duration of custody of the bailed property units, in accordance with terms of the agreement.

8. The method of claim 5, further comprising:
charging by the server interest at a variable interest rate with respect to risk-of-loss of the bailed property units, in accordance with terms of the agreement.

9. The method of claim 2, further comprising:
accessing by the first server, terms of a second agreement between the bailor and a second dealer/dealer/bailee corresponding to bailed second property units owned by the bailor and stored in a second controlled area of the second dealer/bailee;
transmitting by the first server, second customized terms in accordance with the second agreement, to a second local processor in the second controlled area and coupled to a second reader device in the second controlled area, to establish settings for the second reader device, corresponding to a type of event in accordance with the second agreement;
receiving in the first server, a second event signal from the second local processor indicating a detected identity of at least one of the bailed second property units experiencing the second event in accordance with the second agreement between the bailor and the second dealer/dealer/bailee;
accessing by the first server, terms of the second agreement, the first server being coupled to one or more banks having an account of the bailor and an account of the second dealer/dealer/bailee; and
initiating by the first server, a financial transfer by the one or more banks from the second dealer/bailee account to the bailor account in accordance with the second agreement, in response to the received second event signal.

10. The method of claim 1, wherein a reader detects damage or tampering of any of the bailed property units.

11. The method of claim 1, wherein the controlled area includes an array of detectors for detecting the bailed property units and a reader is coupled to one or more of the detectors, to detect entry, removal, damage, or tampering of any of the bailed property units by detecting a signal from a tag of the bailed property unit, the detectors outputting an event signal on a signal line.

12. A system for automatically controlling environmental sensors for monitoring an inventory of bailed property units during storage in a controlled area, comprising:
an array of RFID detectors distributed in the controlled area, configured to detect entry, removal, or tampering of the bailed property units by detecting RFID signals from RFID tags on the bailed property units;
environmental sensors in the controlled area, configured to measure ambient environmental conditions experienced by the bailed property units in the controlled area;
a wireless transceiver in the controlled area, configured to wirelessly communicate with an inventory server;
a local processor and a memory in the controlled area, coupled to the RFID detectors, the environmental sensors, and the wireless transceiver, configured to perform the steps of:
(a) set the environmental sensors to measure custom conditions, such as temperature range for storage in the controlled area, the settings being received from the inventory server;
(b) continuously monitor and store in the memory a record of environmental measurements and times of those measurements in the controlled area during the storage of the property unit;
(c) sequentially query the RFID tags of the property units to determine whether the property units are present or tampering is indicated with within the controlled area;
(d) when tampering is indicated or a property unit is missing from the controlled area or if excessive environmental conditions are measured outside a threshold range in the controlled area, prepare a data report identifying the property unit, a time when the property unit was indicated as missing, tampered with, or experienced the measured environmental conditions; and
(e) transmit the data report as an event signal to the inventory server.

13. The system of claim 12, wherein the controlled area includes a controlled portal for entry or removal of the property units.

14. The system of claim 12, wherein the reader detects damage or tampering of any of the bailed property units.

15. The system of claim 12, wherein the server is programmed to provide control information to the local processor in accordance with an agreement.

16. The system of claim 12, wherein the server is programmed to initiate a financial transfer by one or more banks from a bailee account to a bailor account in accordance with an agreement, based on duration of custody, removal, theft, damage, or tampering of the bailed property units in the controlled area.

17. The system of claim 12, further comprising:
the environmental sensors associated with the controlled area, configured to detect ambient environmental conditions and output an environmental signal associated with the event signal; and
the server programmed to initiate a financial transfer by one or more banks from a bailee account to a bailor account in accordance with an agreement, based on detected deviations from an agreed range of environmental conditions in the controlled area.

18. The system of claim 17, further comprising:
the server programmed to calculate a price of a bailed property unit associated with the financial transfer, in accordance with terms of the agreement.

19. The system of claim 17, further comprising:
the server programmed to charge interest at a variable interest rate with respect to duration of custody of the bailed property units, in accordance with terms of the agreement.

20. The system of claim 17, further comprising:
the server programmed to charge interest at a variable interest rate with respect to risk-of-loss of the bailed property units, in accordance with terms of the agreement.

21. The system of claim 12, wherein the controlled area includes an array of detectors for detecting the bailed property units and the local processor is coupled to one or more of the detectors, to detect entry, removal, damage, or tampering of any of the bailed property units by detecting a signal from a tag of the bailed property unit, the detectors outputting an event signal on a signal line.

22. The system of claim 12, wherein the tags are based on a technology that uses communication via electromagnetic or acoustic waves to exchange data between the reader and the tag, for the purpose of identification.

23. The system of claim 12, further comprising:
a cap containing the tag, fastened to each of the bailed property units; and
a tamper detecting conductor coupled to the tag and fastened to each of the bailed property units, the conductor indicating if the bailed property unit is damaged or tampered with, thereby causing the tag to provide a tampering indication to the reader.

24. The system of claim 12, further comprising:
wherein the inventory server initiates a financial transfer from a bailee account to a bailor account in accordance with a financing/bailment agreement, based on the data report; and
wherein the data report identifying at least the property unit and the measured environmental conditions, documents environmental conditions bearing upon a value of the bailed inventory to which the property unit was subjected through a period of its bailment, thereby allowing a value of environmentally sensitive items of inventory to be accurately ascertained, providing evidence through the data report, that the property unit has retained its value because the measured environmental conditions had existed through-out the period of the bailment.

25. A non-transitory computer readable medium storing program instructions, which when executed by a computer processor, perform the steps comprising:
causing detecting, by an array of RFID detectors distributed in a controlled area, entry, removal, or tampering of the bailed property units by detecting RFID signals from RFID tags on the bailed property units;
causing measuring, by environmental sensors in the controlled area, ambient environmental conditions experienced by the bailed property units in the controlled area;
causing communicating, by a wireless transceiver in the controlled area, with an inventory server;
causing performing, by a local processor and a memory in the controlled area, coupled to the RFID detectors, the environmental sensors, and the wireless transceiver, the steps of:
(a) setting the environmental sensors to measure custom conditions, such as temperature range for storage in the controlled area, the settings being received from the inventory server;
(b) continuously monitoring and storing in the memory a record of environmental measurements and times of those measurements in the controlled area during the storage of the property unit;
(c) sequentially querying the RFID tags of the property units to determine whether the property units are present or tampering is indicated with within the controlled area;
(d) when tampering is indicated or a property unit is missing from the controlled area or if excessive environmental conditions are measured outside a threshold range in the controlled area, preparing a data report identifying the property unit, a time when the property unit was indicated as missing, tampered with, or experienced the measured environmental conditions; and
(e) transmitting the data report as an event signal to the inventory server.

* * * * *